United States Patent
Xiao et al.

(10) Patent No.: US 11,632,680 B2
(45) Date of Patent: Apr. 18, 2023

(54) METHODS FOR PERFORMING NETWORK CONFIGURATION ON APPARATUS AND NETWORK CONFIGURATION SYSTEMS

(71) Applicant: Alibaba Group Holding Limited, Grand Cayman (KY)

(72) Inventors: Yuezhen Xiao, Hangzhou (CN); Chen Chen, Zhejiang (CN); Song You, Hangzhou (CN); Hailong Yu, Hangzhou (CN); Zongfeng Zhang, Hangzhou (CN); Xiaodong Li, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 17/732,371

(22) Filed: Apr. 28, 2022

(65) Prior Publication Data

US 2022/0271994 A1  Aug. 25, 2022

Related U.S. Application Data

(63) Continuation of application No. 17/028,698, filed on Sep. 22, 2020, now Pat. No. 11,343,685, which is a (Continued)

(30) Foreign Application Priority Data

Mar. 22, 2018  (CN) .......................... 201810241222.0

(51) Int. Cl.
*H04W 24/02* (2009.01)
*H04W 12/50* (2021.01)
(Continued)

(52) U.S. Cl.
CPC ......... *H04W 24/02* (2013.01); *H04L 41/0803* (2013.01); *H04W 8/245* (2013.01);
(Continued)

(58) Field of Classification Search
CPC ..... H04W 24/02; H04W 8/245; H04W 12/50; H04W 48/16; H04W 60/00;
(Continued)

(56) References Cited

U.S. PATENT DOCUMENTS 7,756,507 B2  7/2010 Morper
8,181,262 B2  5/2012 Cooper et al.
(Continued)

FOREIGN PATENT DOCUMENTS

CN  104506397 A  4/2015
CN  105100010 A  11/2015
(Continued)

OTHER PUBLICATIONS

Translation of CN Office Action for corresponding CN Application No. 201810241222.0 dated Mar. 9, 2021, 5 pages.
(Continued)

*Primary Examiner* — Kyaw Z Soe
(74) *Attorney, Agent, or Firm* — Lee & Hayes, P.C.

(57) ABSTRACT

Methods for performing network configuration on apparatus and network configuration systems are provided. The method includes: receiving a network configuration request sent by a network configuration application, wherein the network configuration request includes hotspot information of an online hotspot; generating a hotspot switching command based on the network configuration request; and sending the hotspot switching command to an apparatus needing network configuration through a network configuration hotspot, to make the apparatus switch a hotspot that the apparatus currently connects to from the network configuration hotspot to the online hotspot.

20 Claims, 14 Drawing Sheets

Related U.S. Application Data continuation of application No. PCT/CN2019/077608, filed on Mar. 11, 2019.

(51) Int. Cl.
- *H04W 8/24* (2009.01)
- *H04W 48/16* (2009.01)
- *H04W 60/00* (2009.01)
- *H04L 41/0803* (2022.01)
- *H04W 72/23* (2023.01)

(52) U.S. Cl.
CPC .......... *H04W 12/50* (2021.01); *H04W 48/16* (2013.01); *H04W 60/00* (2013.01); *H04W 72/23* (2023.01)

(58) Field of Classification Search
CPC ... H04W 72/042; H04W 36/00; H04W 48/18; H04W 36/0011; H04W 36/0083; H04L 41/0803

See application file for complete search history.

(56) References Cited

U.S. PATENT DOCUMENTS

| | | |
|---|---|---|
| 9,125,059 B2 | 9/2015 | Hansmann et al. |
| 9,621,562 B2 | 4/2017 | Furuichi et al. |
| 9,628,992 B2 | 4/2017 | Dimatteo, III et al. |
| 9,674,768 B2 | 6/2017 | Qin et al. |
| 10,045,327 B2 | 8/2018 | Lotter et al. |
| 10,616,232 B2 | 4/2020 | Zhong |
| 10,631,154 B2 | 4/2020 | Granbery |
| 10,735,419 B2 | 8/2020 | Sabin et al. |
| 2009/0175221 A1 | 7/2009 | Visuri et al. |
| 2015/0341965 A1 | 11/2015 | Spencer et al. |
| 2016/0219496 A1 | 7/2016 | Jang et al. |
| 2018/0295121 A1 | 10/2018 | Anantha et al. |
| 2019/0297656 A1* | 9/2019 | Yuan .................... H04W 88/10 |
| 2021/0006990 A1 | 1/2021 | Xiao et al. |
| 2021/0021988 A1* | 1/2021 | Boliek ................. H04L 65/612 |

FOREIGN PATENT DOCUMENTS

| | | |
|---|---|---|
| CN | 106209537 A | 12/2016 |
| CN | 106993278 A | 7/2017 |
| CN | 107241679 | 10/2017 |
| CN | 107466055 | 12/2017 |

OTHER PUBLICATIONS

Translation of CN Search Report for corresponding CN Application No. 201810241222.0 dated Mar. 2, 2021, 2 pages.

Translation of CN Second Office Action for corresponding CN Application No. 201810241222.0 dated Oct. 26, 2021, 8 pages.

Translation of International Search Report for corresponding PCT Application No. PCT/CN2019/077608 dated May 16, 2019, 2 pages.

Translation of Written Opinion for corresponding PCT Application No. PCT/CN2019/077608 dated May 16, 2019, 4 pages.

\* cited by examiner

METHODS FOR PERFORMING NETWORK CONFIGURATION ON APPARATUS AND NETWORK CONFIGURATION SYSTEMS

CROSS REFERENCE TO RELATED PATENT APPLICATIONS

This application is a continuation of, and claims priority to, U.S. application Ser. No. 17/028,698, filed on Sep. 22, 2020, which claims priority to and is a continuation of PCT Patent Application No. PCT/CN2019/077608 filed on Mar. 11, 2019, and is related to and claims priority to the Chinese patent application No. 201810241222.0, filed on Mar. 22, 2018, entitled "Methods for Performing Network configuration on Apparatus and Network Configuration Systems", which applications are hereby incorporated by reference in their entirety.

TECHNICAL FIELD

The present disclosure relates to the technical field of network connections, in particular to methods for performing network configurations on apparatuses, apparatuses performing network configurations, terminals for performing network configurations on apparatuses, servers for performing network configurations on apparatuses, routers for performing network configurations on apparatuses, network configuration systems, systems, and machine-readable media.

BACKGROUND

With the development of science and technology, the number of apparatuses having Wi-Fi function is increasing. An apparatus with Wi-Fi function can be configured on a router, so that a user's cell phone can control the apparatus through the router. The process of configuring the apparatus with Wi-Fi function to the router can be called network configuration.

In conventional techniques, network configuration solutions roughly include the following two categories: SmartConfig (Wi-Fi broadcast or multicast encoding network configuration) solution and SoftAP solution:

The SmartConfig solution refers to that an APP terminal of a cell phone sends a UDP broadcast packet or multicast packet containing SSID (Service Set Identifier, which generally refers to a name of a router hotspot) and PASSWD (the password of the router hotspot), and a Wi-Fi module of an apparatus can receive the UDP packet and decrypt the SSID and the PASSWD through the received UDP packet if the organization form of the UDP is known, and the apparatus then configures the received SSID and PASSWD to a designated Wi-Fi AP (Wireless Access Point). However, the Wi-Fi connection is not established during the communication process of the SmartConfig solution, and the communication reliability cannot be guaranteed. In addition, if the apparatus loses a packet representing any byte of the SSID and the PASSWD, the AP information cannot be parsed, resulting in a low success rate of network configuration.

The SoftAP solution requires that the network configuration hotspot be turned on in the apparatus, and the TCP/UDP server must be turned on at the same time. A user uses a cell phone to connect to the network configuration hotspot of the apparatus, and configures the apparatus based on the TCP/UDP server of the apparatus. In this process, the user needs to manually disconnect the cell phone from an original Wi-Fi hotspot, and then manually connect the cell phone to a hotspot of the apparatus, and the cell phone cannot connect to the Internet during the network configuration process, resulting in complicated operations and poor user experience.

In addition, both the SmartConfig solution and the SoftAP solution require the user to actively initiate the network configuration. During the network configuration process, the user needs to manually input the SSID and the PASSWD. Therefore, there is a risk of input errors and the user experience is poor. In addition, before the network configuration, the user needs to actively sense the existence of the apparatus and actively start the network configuration. This process requires the user to have the willingness to actively start the network configuration, and thus is difficult to promote.

SUMMARY

This Summary is provided to introduce a selection of implementations in a simplified form that is further described below in the Detailed Description. This Summary is not intended to identify all features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of the above-mentioned problems, the example embodiments of the present disclosure are proposed in order to provide methods for performing network configuration on apparatus, corresponding apparatus for network configuration, terminals for performing network configuration on apparatus, servers for performing network configuration on apparatus, routers for performing network configuration on apparatus, network configuration systems, systems, and machine-readable media that overcome the above-mentioned problems or at least partially solves the above-mentioned problems.

In order to solve the above-mentioned problems, the example embodiments of the present disclosure disclose a method for performing network configuration on apparatus, and the method comprises:

connecting, by an apparatus, to a network configuration hotspot provided by a router;

sending first apparatus information of the apparatus to a server through the network configuration hotspot;

receiving a hotspot switching command sent by the server according to the first apparatus information, wherein the hotspot switching command includes hotspot information of an online hotspot;

connecting to the online hotspot based on the hotspot switching command when a designated network configuration condition is met.

In an example embodiment, connecting, by the apparatus, to the network configuration hotspot provided by the router comprises:

obtaining a network configuration hotspot list, wherein the network configuration hotspot list includes at least one network configuration hotspot and/or signal strength of the network configuration hotspot;

connecting to the network configuration hotspot with the strongest signal strength;

when the connecting fails, connecting to the network configuration hotspot with a second strongest signal strength until the connecting to the network configuration hotspot succeeds.

In an example embodiment, sending first apparatus information of the apparatus to the server through the network configuration hotspot comprises:

sending a connection request to the server through the network configuration hotspot to establish a secure connection between the apparatus and the server;

obtaining the first apparatus information of the apparatus;

sending the first apparatus information and the network configuration hotspot list to the server.

In an example embodiment, before receiving the hotspot switching command sent by the server, the method further comprises:

when a touch operation of a user is detected, entering a network configuration mode.

In an example embodiment, the designated network configuration condition at least includes the following condition:

the apparatus entering the network configuration mode, and duration of entering the network configuration mode does not exceed a preset duration.

In an example embodiment, the method further comprises:

generating network configuration error information when the designated network configuration condition is not met;

sending the network configuration error information to the server.

In an example embodiment, after connecting to the online hotspot based on the hotspot switching command when the designated network configuration condition is met, the method further comprises:

obtaining second apparatus information of the apparatus;

announcing the second apparatus information to the outside locally, and/or establishing a secure connection with the server based on the online hotspot, and sending the second apparatus information to the server.

The example embodiments of the present disclosure also disclose a method for performing network configuration on apparatus, and the method comprises:

determining, by a network configuration application, a target network configuration apparatus, wherein the target network configuration apparatus connects to a network configuration hotspot provided by a router in advance and sends first apparatus information of the target network configuration apparatus to a server;

generating a network configuration request based on the first apparatus information and hotspot information of a currently connected online hotspot;

sending the network configuration request to the server to request the server to perform network configuration on the apparatus according to the hotspot information of the online hotspot.

In an example embodiment, after sending the network configuration request to the server to request the server to perform the network configuration on the apparatus according to the hotspot information of the online hotspot, the method further comprises:

receiving network configuration response information returned by the server based on the network configuration request, wherein the network configuration response information includes network configuration approval information, and the network configuration approval information includes instruction information of user touch operation;

display the network configuration approval information;

upon determining that a user performs a touch operation based on the network configuration approval information, generating network configuration preparation information;

sending the network configuration preparation information to the server to notify the server to perform the network configuration on the apparatus.

In an example embodiment, the network configuration response information further includes network configuration rejection information, and the method further comprises:

displaying the network configuration rejection information to prompt the user to prohibit operating the apparatus.

In an example embodiment, before determining by the network configuration application the target network configuration apparatus, the method further comprises:

connecting, by the network configuration application, to the online hotspot of the router and establishing a secure connection with the server.

In an example embodiment, determining, by the network configuration application, the target network configuration apparatus comprises:

determining the hotspot information of the online hotspot;

obtaining a to-be-network-configured apparatus list from the server side based on the hotspot information, the to-be-network-configured apparatus list including one or more apparatus to be network-configured, and first apparatus information of the apparatus;

displaying the to-be-network-configured apparatus list;

setting the apparatus selected by a user in the to-be-network-configured apparatus list as the target network configuration apparatus.

In an example embodiment, the method further comprises:

obtaining second apparatus information of the apparatus, wherein the second apparatus information is apparatus information after the network configuration of the apparatus succeeds;

determining that the network configuration of the apparatus succeeds based on the second apparatus information;

generating network configuration success information, and displaying the network configuration success information.

In an example embodiment, obtaining the second apparatus information of the apparatus comprises:

receiving the second apparatus information broadcast by the apparatus; or broadcasting a query request in local, and receiving the second apparatus information returned by the apparatus based on the query request.

In an example embodiment, the method further comprises:

generating a binding request based on the second apparatus information;

sending the binding request to the server to request the server to bind the second apparatus information and a corresponding apparatus;

receiving a binding result returned by the server based on the binding request.

The example embodiments of the present disclosure also disclose a method for performing network configuration on apparatus, and the method comprises:

receiving a network configuration request sent by a network configuration application, wherein the network configuration request includes hotspot information of an online hotspot;

generating a hotspot switching command based on the network configuration request;

sending the hotspot switching command to an apparatus needing network configuration through a network configuration hotspot, to make the apparatus switch a hotspot that the apparatus currently connects to from the network configuration hotspot to the online hotspot.

In an example embodiment, before sending the hotspot switching command to the apparatus needing network configuration through the network configuration hotspot, the method further comprises:

establishing, by a server, a secure connection with the apparatus needing network configuration through the network configuration hotspot of a router; receiving first apparatus information sent by the apparatus and a network configuration hotspot list obtained by the apparatus;

generating an association relationship between the first apparatus information and the network configuration hotspot list;

saving the first apparatus information, the network configuration hotspot list, and the association relationship.

In an example embodiment, each network configuration hotspot in the network configuration hotspot list includes a Basic Service Set Identifier (BSSID);

before receiving the network configuration request sent by the network configuration application, the method further comprises:

establishing a secure connection with the network configuration application through the online hotspot of a router;

receiving the hotspot information of the online hotspot sent by the network configuration application, wherein the hotspot information of the online hotspot includes the BSSID of the online hotspot;

matching the BSSID of the online hotspot with BSSIDs in the network configuration hotspot list corresponding to all apparatuses stored in the server to obtain a to-be-network-configured apparatus list;

sending the to-be-network-configured apparatus list to be configured to the network configuration application.

In an example embodiment, after receiving the network configuration request sent by the network configuration application, the method further comprises:

serializing all network configuration requests received for the same apparatus;

processing the network configuration requests for the same apparatus one by one according to a preset processing sequence; during the processing, when a certain network configuration request is approved, temporarily storing or rejecting other network configuration requests for the same apparatus within a preset duration for processing the network configuration request until the approved network configuration request is processed or timed out.

In an example embodiment, generating the hotspot switching command based on the network configuration request comprises:

generating network configuration approval information when the network configuration request is approved, wherein the network configuration approval information includes instruction information of user touch operation, and the network configuration approval information is configured to prompt the user to perform a touch operation on the apparatus;

generating a network configuration rejection information when the network configuration request is rejected, wherein the network configuration rejection information is configured to prompt the user to prohibit operating the apparatus;

generating network configuration response information based on the network configuration approval information or the network configuration rejection information, and sending the network configuration response information to the network configuration application;

receiving network configuration preparation information sent by the network configuration application based on the network configuration approval information, wherein the network configuration preparation information is information generated after the network configuration application determining that the user performs the touch operation based on the network configuration approval information;

generating the hotspot switching command according to the network configuration preparation information.

In an example embodiment, after sending the hotspot switching command to the apparatus, the method further comprises:

receiving network configuration error information sent by the apparatus, wherein the network configuration error information is information generated when the apparatus determines that a designated network configuration condition is not met after receiving the hotspot switching command.

In an example embodiment, after sending the hotspot switching command to the apparatus, the method further comprises:

determining that the network configuration of apparatus succeeds when second apparatus information sent by the apparatus is received;

receiving a binding request sent by the network configuration application, wherein the binding request includes second apparatus information of the apparatus;

upon determining that the second apparatus information sent by the apparatus is consistent with the second apparatus information sent by the network configuration application, generating a binding relationship between the second apparatus information and the apparatus, and returning a binding result to the network configuration application.

The example embodiments of the present disclosure also disclose a method for performing network configuration on apparatus, and the method comprises:

intercepting a connection request sent by an apparatus to a corresponding server when a router detects that the apparatus is connected to a network configuration hotspot of the router;

determining whether a server corresponding to the connection request meets a preset condition;

when the server meets the preset condition, sending the connection request to the server to make the server establish a secure connection with the apparatus and perform network configuration on the apparatus.

In an example embodiment, the method further comprises:

discarding the connection request when the server does not meet the preset condition.

In an example embodiment, determining whether the server corresponding to the connection request meets the preset condition comprises:

determining vendor information of the server corresponding to the connection request;

determining whether a vendor corresponding to the vendor information pays for a current network configuration service;

if yes, determining that the server corresponding to the connection request meets the preset condition;

if not, determining that the server corresponding to the connection request does not meet the preset condition.

In an example embodiment, before intercepting the connection request sent by the apparatus to the corresponding server when the router detects that the apparatus is connected to the network configuration hotspot of the router, the method further comprises:

after the router is powered on, turning on the network configuration hotspot, and setting the network configuration hotspot as a hidden hotspot.

The example embodiments of the present disclosure also disclose an apparatus for network configuration, and the apparatus comprises:

a network configuration hotspot connection module, configured to connect to a network configuration hotspot provided by a router;

a first apparatus information sending module, configured to send a first apparatus information of the apparatus to a server through the network configuration hotspot;

a hotspot switching command receiving module, configured to receive a hotspot switching command sent by the server according to the first apparatus information, the hotspot switching command including hotspot information of an online hotspot;

a hotspot switching module, configured to connect to the online hotspot based on the hotspot switching command when a designated network configuration condition is met.

The example embodiments of the present disclosure also disclose a terminal for performing network configuration on apparatus, and the terminal comprises:

a target network configuration apparatus determining module, configured to determine a target network configuration apparatus by using a network configuration application, wherein the target network configuration apparatus connects to a network configuration hotspot provided by a router in advance and sends first apparatus information of the target network configuration apparatus to a server;

a network configuration request generating module, configured to generate a network configuration request based on the first apparatus information and hotspot information of a currently connected online hotspot;

a network configuration request sending module, configured to send a network configuration request to the server to request the server to perform network configuration on the apparatus according to the hotspot information of the online hotspot.

The example embodiments of the present disclosure also disclose a server for performing network configuration on apparatus, and the server comprises:

a network configuration request receiving module, configured to receive a network configuration request sent by a network configuration application, wherein the network configuration request includes hotspot information of an online hotspot;

a hotspot switching command generating module, configured to generate a hotspot switching command based on the network configuration request;

a hotspot switching command sending module, configured to send the hotspot switching command to an apparatus needing network configuration through a network configuration hotspot to make the apparatus switch a hotspot that the apparatus connects to from the network configuration hotspot to the online hotspot.

The example embodiments of the present disclosure also disclose a router that performs network configuration on apparatus, and the router comprises:

a connection request interception module, configured to intercept a connection request sent by an apparatus to a corresponding server when a router detects that the apparatus connects to a network configuration hotspot of the router;

a determining module, configured to determine whether a server corresponding to the connection request meets a preset condition;

a connection request sending module, configured to send the connection request to the server when the server meets the preset condition to make the server establish a secure connection with the apparatus, and perform network configuration on the apparatus.

The example embodiments of the present disclosure disclose a network configuration system comprising the apparatus, the terminal, the server, and the router.

The example embodiments of the present disclosure also disclose a system comprising:

one or more processors; and one or more machine-readable media with instructions stored thereon, when executed by the one or more processors, causing the system to execute the method for performing network configuration on apparatus.

The example embodiments of the present disclosure also disclose one or more machine-readable media having instructions stored thereon, when executed by one or more processors, causing the one or more processors to execute the method for performing network configuration on apparatus.

The example embodiments of the present disclosure provide the following advantages.

In the example embodiments of the present disclosure, the network configuration is realized by providing a network configuration hotspot by a router; sending first apparatus information of an apparatus to a server through the network configuration hotspot after the apparatus connects to the network configuration hotspot; receiving a hotspot switching command from the server; and switching the apparatus to an online hotspot according to hotspot information of the online hotspot contained in the hotspot switching command, so as to realize a reliable connection during the network configuration process, and improve the success rate of the network configuration of the apparatus.

In addition, after a network configuration application connected to an online hotspot determines a target network configuration apparatus, the network configuration application can actively obtain the hotspot information of the online hotspot and the first apparatus information of the target network configuration apparatus, generate a network configuration request according to the first apparatus information and the hotspot information, and send the network configuration request to the server to request the server to perform the apparatus network configuration according to the hotspot information of the online hotspot. Therefore, the network configuration process is more automated, which simplifies user operations and reduces the amount of information entered by the user, thereby reducing the probability that user mistypes, and increasing the success rate and the efficiency of the network configuration.

In addition, in the example embodiments of the present disclosure, to realize the network configuration service, the router only needs to turn on the network configuration hotspot. Therefore, there is basically no need to modify the existing routers on the market, which makes the network configuration solution of the example embodiments of the present disclosure very easy to promote and to expand the business model of router network configuration.

BRIEF DESCRIPTION OF THE DRAWINGS

In order to illustrate the example embodiments of the present disclosure more clearly, the drawings used in the description of the example embodiments will be briefly introduced below. The drawings in the following description merely represent some of the example embodiments of the present disclosure, and other drawings may be obtained from these drawings by those skilled in the art without any creative efforts.

DETAILED DESCRIPTION

To enable a person of ordinary skill in the art to better understand the present disclosure, hereinafter, technical solutions in the example embodiments of the present disclosure will be thoroughly described with reference to the accompanying drawings in the example embodiments of the present disclosure. Example embodiments described herein merely represent some of the example embodiments of the present disclosure. Other example embodiments obtained by a person of ordinary skill in the art based on the example embodiments of the present disclosure without making creative efforts should fall within the scope of the present disclosure.

In order to make the above objectives, features, and advantages of the application clearer and more understandable, the application will be further described in detail below with reference to the drawings and example embodiments.

Figure 1:
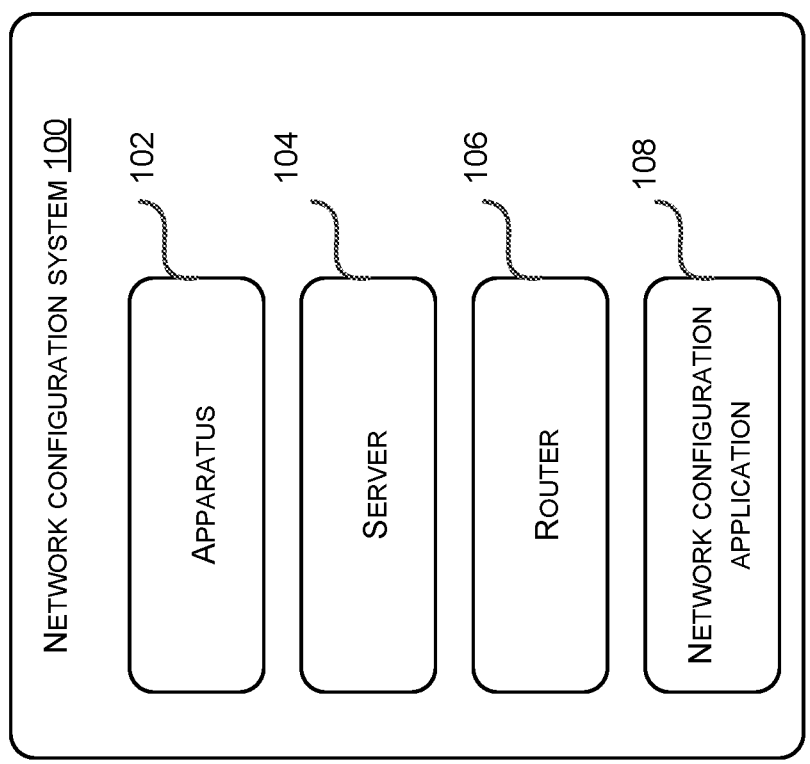
FIG. 1 is a structural block diagram of an example embodiment of a network configuration system of the present disclosure.

Referring to FIG. 1, a structural block diagram of an example embodiment of a network configuration system 100 of the present disclosure is shown. In an example embodiment, the network configuration system 100 may at least include: an apparatus 102, a server 104, a router 106, and a network configuration application (network configuration app) 108 installed on a terminal.

In the example embodiments of the present disclosure, the router 106 is provided with a network configuration hotspot. In combination with the network configuration hotspot, the router 106 may provide network configuration services, which enriches the functions of the router and may simplify the network configuration process and improve user experience.

Figure 2:
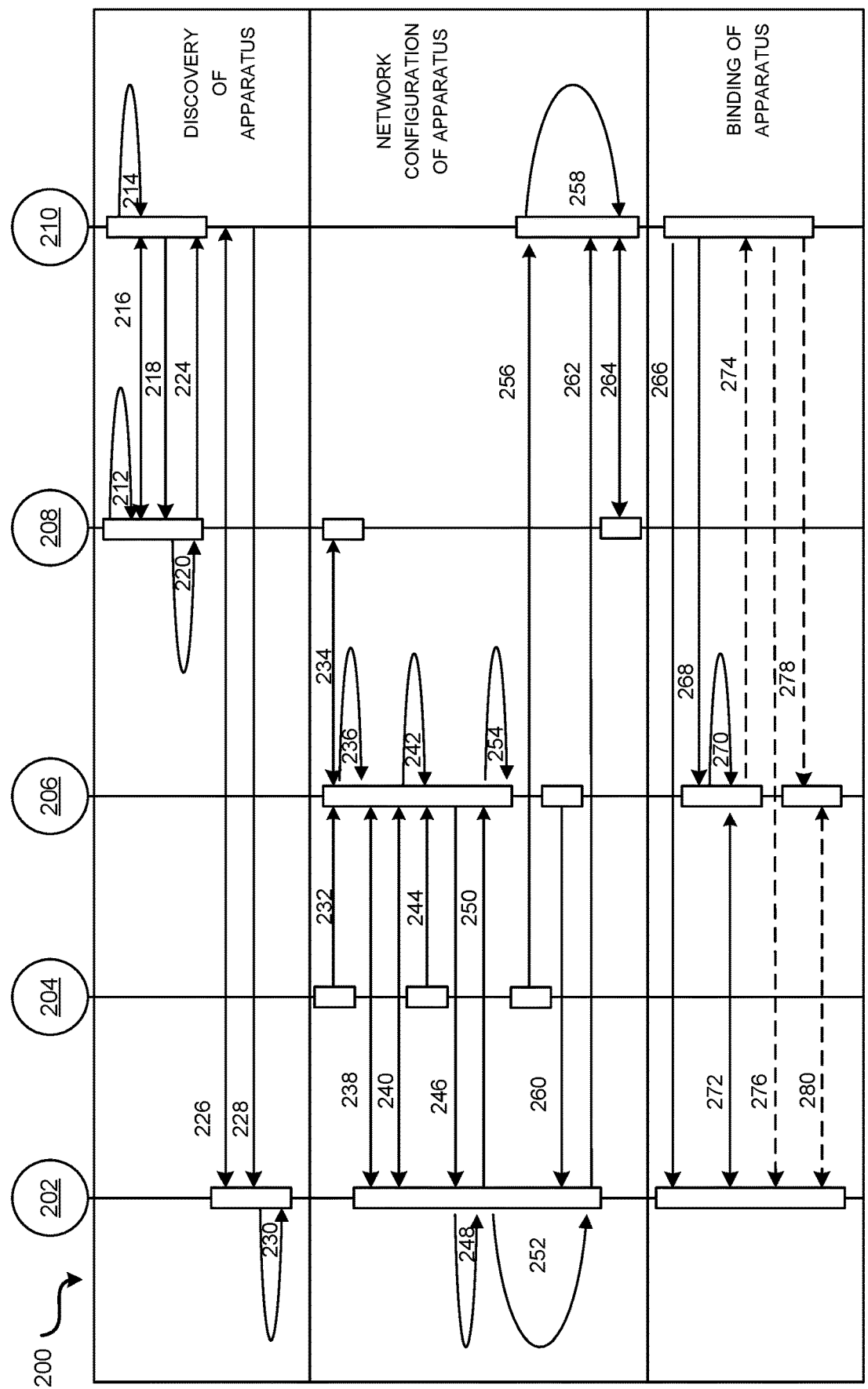
FIG. 2 is a schematic diagram of a network configuration process of the present disclosure.

FIG. 2 is a schematic diagram of a network configuration process 200 of the present disclosure. The network configuration process 200 may relate to a vendor cloud 202, a user 204, a vendor App 206, a router 208, and an apparatus 210. In an example embodiment, referring to the schematic diagram of the network configuration process shown in FIG. 2, the network configuration solution provided by the network configuration system of the present disclosure may include a process of discovery of apparatus, a process of network configuration of apparatus, a process of binding of apparatus, etc. The description is as follows.

Discovery of Apparatus

At 212, the router 208 turns on a network configuration hidden hotspot.

At 214, the apparatus 210 is powered on, and scan all the network configuration hotspot.

At 216, the apparatus 210 connects to the network configuration hotspot with the best signal strength.

At 218, the apparatus 210 initiates vendor cloud Domain Name System (DNS).

At 220, the router 208 checks whether the vendor purchases the network configuration service.

At 224, the router 208 returns the effective IP address of the vendor cloud 202 to the apparatus 210.

At 226, the apparatus 210 establishes TLS secure connection/verification apparatus information with the vendor cloud 202 end.

At 228, the apparatus 210 uploads apparatus information/network configuration hotspot list to the vendor cloud 202.

At 230, the vendor cloud 202 saves apparatus information and network configuration hotspot list.

Network Configuration of Apparatus

At 232, the user 204 opens the network configuration.

At 234, the vendor cloud 206 connects to the online hotspot defaulted by the router 208.

At 236, the vendor App 206 obtains the BSSID and SSID of the online hotspot.

At 238, the vendor App 206 establishes the secure connection to the vendor cloud 202 end, and verifies the user information.

At 240, the vendor App 206 obtains a to-be-network-configured apparatus list based on the BSSID.

At 242, the vendor App 206 displays the to-be-network-configured apparatus list.

At 244, the user 204 selects the apparatus and inputs the password.

At 246, the vendor App 206 notifies the vendor cloud 202 end, requesting network configuration, sending the apparatus information and the router information.

At 248, the vendor cloud 202 serializes the network configuration request.

At 250, the vendor cloud 202 notifies the vendor App 206 the result of the network configuration request.

At 252, the vendor cloud 202 opens the network configuration window for 1-3 minutes.

At 254, the vendor App 206 guides the user to touch the apparatus.

At 256, the user 204 touches the apparatus and enters network configuration mode.

At 258, the apparatus 210 opens the configuration window for 60 seconds.

At 260, the vendor App 206 notifies the cloud end apparatus to enter the network configuration state.

At 262, the vendor cloud 202 issues online hotspot switching command. The hotspot switching command may include SSID, PASSWD, BSSID.

At 264, the apparatus 210 switches to the online hotspot.
Binding of Apparatus

At 266, the apparatus 210 establishes TLS secure connection to the vendor cloud 202 end and uploads the apparatus information. The apparatus information may include the apparatus information and a token.

At 268, the apparatus 210 notifies the vendor App 206 that the network configuration of the apparatus 210 succeeds, sending the apparatus information and the token.

At 270, the vendor App 206 prompts the user 204 that the network configuration succeeds, At 272, the vendor App 206 binds the apparatus, sending the apparatus information and the token to the vendor cloud 202.

At 274, the vendor App 206 locally and actively queries the apparatus information.

At 276, the apparatus 210 uploads the apparatus information to the cloud end. The apparatus information may include the apparatus information and the token.

At 278, the apparatus 210 returns the apparatus information to the vendor App 206. The apparatus information may include the apparatus information and the token.

At 280, the vendor App 206 binds the apparatus, sending the apparatus information and the token to the vendor cloud 202.

Additional details of the process of discovery of apparatus, the process of network configuration of apparatus, and the process of binding of apparatus are given hereinafter with reference to FIG. 3, FIG. 4, and FIG. 5.

I. Process of Discovery of Apparatus

Figure 3:
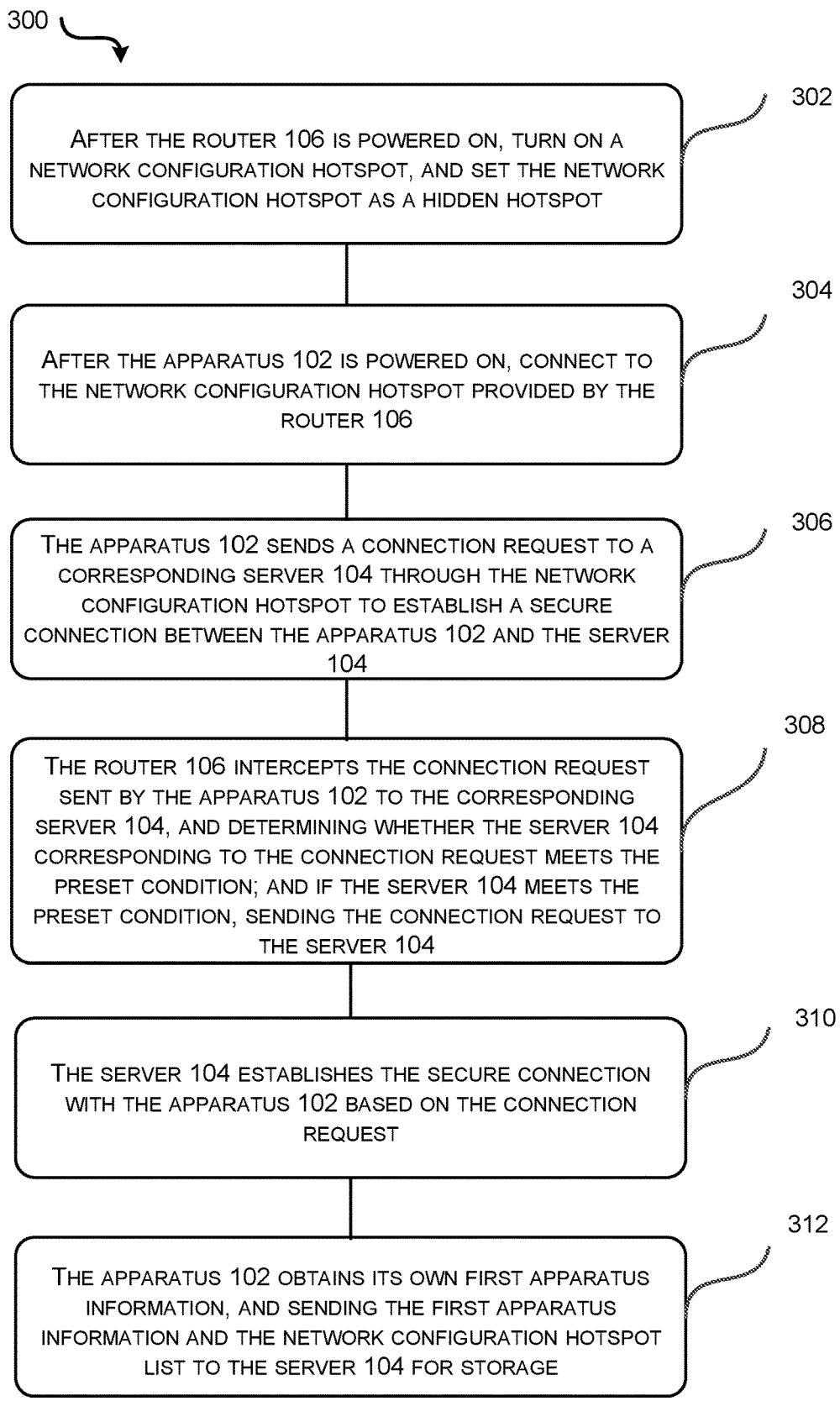
FIG. 3 is a flowchart of steps of an example embodiment of a process of discovery of an apparatus of the present disclosure.

Referring to FIG. 3, a flowchart of steps of an example embodiment of a discovery process 300 of the apparatus is shown, which may include the following steps.

At 302, after the router 106 is powered on, turning on a network configuration hotspot, and setting the network configuration hotspot as a hidden hotspot.

In implementations, the hotspots may be divided into normal hotspots and hidden hotspots. The normal hotspots are visible to surrounding apparatuses (a beacon of a normal hotspot contains SSID of the hotspot, and the surrounding apparatuses may parse the SSID of the normal hotspot by detecting the beacon), and the hidden hotspots are invisible to surrounding apparatuses (the beacon of a hidden hotspot does not carry the SSID, and the surrounding apparatuses cannot parse the SSID according to the beacon). The hidden hotspots cannot be discovered by surrounding apparatuses, and will not be connected by surrounding apparatuses. The hidden hotspots can only be connected by specific apparatuses.

In practice, when the network configuration hotspot is set as a hidden hotspot, the network configuration hotspot may be called a hidden network configuration hotspot. After the router is powered on, the hidden network configuration hotspot may be turned on, so that the hidden network configuration hotspot can only be discovered by designated apparatuses.

At 304, after the apparatus 102 is powered on, connecting to the network configuration hotspot provided by the router 106.

In example embodiments of the present disclosure, when the apparatus 102 is powered on, connecting to the network configuration hotspot provided by the router 106 may include the following sub-steps:

Obtaining a network configuration hotspot list, where the network configuration hotspot list includes at least one network configuration hotspot, and signal strength of the network configuration hotspot; connecting to a network configuration hotspot with the strongest signal strength; if the connecting fails, connecting to a network configuration hotspot with a second strongest signal strength until the connecting to a network configuration hotspot succeeds.

In an example embodiment, as shown in FIG. 2, when powered on and started, the apparatus 102 will actively scan all the surrounding network configuration hotspots. In implementations, the apparatus will scan the network configuration hotspots on all channels and obtain hotspot information of each network configuration hotspot.

As an example, the hotspot information of the network configuration hotspot may include at least the following information: BSSID (Basic Service Set Identifier), SSID (Service Set Identifier, which generally refers to the name of the router hotspot), Channel (channel identifier), RSSI (Received Signal Strength Indicator, which refers to the received signal strength indicator), etc.

In an example embodiment, for a network configuration hotspot set as a hidden hotspot, the apparatus 102 may use the following methods to detect the hidden network configuration hotspot.

The apparatus 102 broadcasts a Probe-req frame, where the Probe-req frame contains the SSID of the hidden network configuration hotspot; the hidden network configuration hotspot parses the SSID after receiving the Probe-req frame, and upon determining that the obtained SSID is the same as its own SSID, the network configuration hotspot replies with a Probe-resp frame containing the SSID, such that the apparatus 102 can, according to the Probe-resp frame, determine that the hidden network configuration hotspot has been detected.

After scanning the network configuration hotspots on all channels, the apparatus 102 may insert the newly discovered network configuration hotspots into a local network configuration hotspot list in descending order of RSSI to obtain a new network configuration hotspot list.

Subsequently, the apparatus 102 starts to connect to the network configuration hotspot. First, the apparatus 102 may connect to a network configuration hotspot with the strongest signal strength. If the connecting fails, the network configuration hotspot with signal strength only lower than that of the previous network configuration hotspot is selected and the above steps are repeated until the connecting succeeds.

At 306, the apparatus 102 sends a connection request to a corresponding server 104 through the network configuration hotspot to establish a secure connection between the apparatus 102 and the server 104.

In the example embodiments of the present disclosure, the server 104 may include a cloud server 104 provided by the service vendor of the apparatus 102, which is also called vendor cloud.

As an example, the connection request may include the domain name or IP address of the server 104. In an example embodiment, when connecting to the network configuration hotspot, the apparatus 102 may initiate domain name resolution (DNS) for the vendor cloud. At this time, the apparatus 102 may use the domain name or IP address of the server 104 to generate a connection request, and send the connection request to the respective server 104 through the router 106 to try to establish a secure connection with the respective cloud, wherein the secure connection may include a TLS (Transport Layer Security) connection, thereby ensuring data security.

In the process of establishing the secure connection, the router 106 may intercept the connection request and execute step 4.

At 308, the router 106 intercepts the connection request sent by the apparatus 102 to the corresponding server 104, and determines whether the server 104 corresponding to the connection request meets the preset condition; and if the server 104 meets the preset condition, sends the connection request to the server 104.

In implementations, the router vendor may provide some services, for example, the network configuration service provided by the router 106 in the example embodiments of the present disclosure, to the apparatus vendor through the router104. Therefore, when the apparatus 102 tries to establish a connection with the corresponding cloud server 104, the connection request will be intercepted by the router 106, and whether the cloud server 104 meets some preset condition required for the service is determined, and if so, the connection request will be sent to the server 104. Otherwise, the connection request is discarded.

In example embodiments of the present disclosure, the determining of whether the server 104 corresponding to the connection request meets a preset condition includes:

Determining the vendor information of the server 104 corresponding to the connection request; determining whether the vendor corresponding to the vendor information pays for the current network configuration service; if so, determining that the server corresponding to the connection request meets the preset condition; if not, determining that the server corresponding to the connection request does not meet the preset condition.

In an example embodiment, the router 106 may intercept a domain name resolution service request of the vendor cloud or a packet whose IP layer destination address is the IP address of the vendor cloud, and then determine whether the vendor corresponding to the vendor cloud pays for the current network configuration service. If the vendor corresponding to the vendor cloud does not pay or the payment is overdue, that the vendor corresponding to the vendor cloud does not meet the preset condition is determined. In this case, the service may be rejected directly, the corresponding connection request may be discarded, and the corresponding vendor may be notified to subscribe to the service or continue to pay. Correspondingly, if the vendor corresponding to the vendor cloud has purchased the network configuration service and the service has not expired, that the vendor corresponding to the vendor cloud meets the preset condition is determined. At this time, the related packet may be forwarded to the cloud server 104 based on the IP address or DNS of the vendor cloud. At the same time, if the router 106 determines that the server 104 meets the preset condition, it may also return a valid IP address of the server 104 to the apparatus 102.

Through the example embodiments of the present disclosure, there is basically no need to modify the existing routers on the market. To provide the network configuration service, it is only required to open a network configuration hotspot through an API or a configuration page, thereby making the network configuration solution of the example embodiments of the present disclosure very easy to promote.

Furthermore, through the network configuration solution of the example embodiments of the present disclosure, the router may clarify the business model corresponding thereto, and the network configuration requirements of future smart cities may be met by just a slight modification.

At 310, the server 104 establishes the secure connection with the apparatus 102 based on the connection request.

In implementations, the process of establishing a TLS secure connection requires multiple interactions, in which apparatus information will be exchanged. The server 104 may verify the legality of the apparatus information during the process of establishing the TLS connection with the apparatus 102.

If the TLS connection fails, return to 306 and 308 to re-establish the connection until the connection is successfully established.

Once the apparatus 102 successfully establishes the secure connection with the server 104, it will always remain connected to the current network configuration hotspot, and if an exception occurs, repeat 306 to 310.

At 312, the apparatus 102 obtains its own first apparatus information, and sends the first apparatus information and the network configuration hotspot list to the server 104 for storage.

In an example embodiment, after the apparatus 102 establishes the secure connection with the cloud server 104, the first apparatus information of the apparatus and the scanned network configuration hotspot list may be sent to the server 104, where the network configuration hotspot list may include hotspot information corresponding to each network configuration hotspot.

As an example, the first apparatus information may include an apparatus key Product key, an apparatus identifier device name, and so on. However, it should be noted that the example embodiments of the present disclosure do not limit the first apparatus information, which may be customized by the apparatus vendor, as long as the apparatus is synchronized with the apparatus information on the respective vendor cloud.

After receiving the first apparatus information and the network configuration hotspot list, the server 104 stores the first apparatus information and the network configuration hotspot list. So far, the process of discovery of the apparatus is completed.

II. Process of Network Configuration of Apparatus

Figure 4:
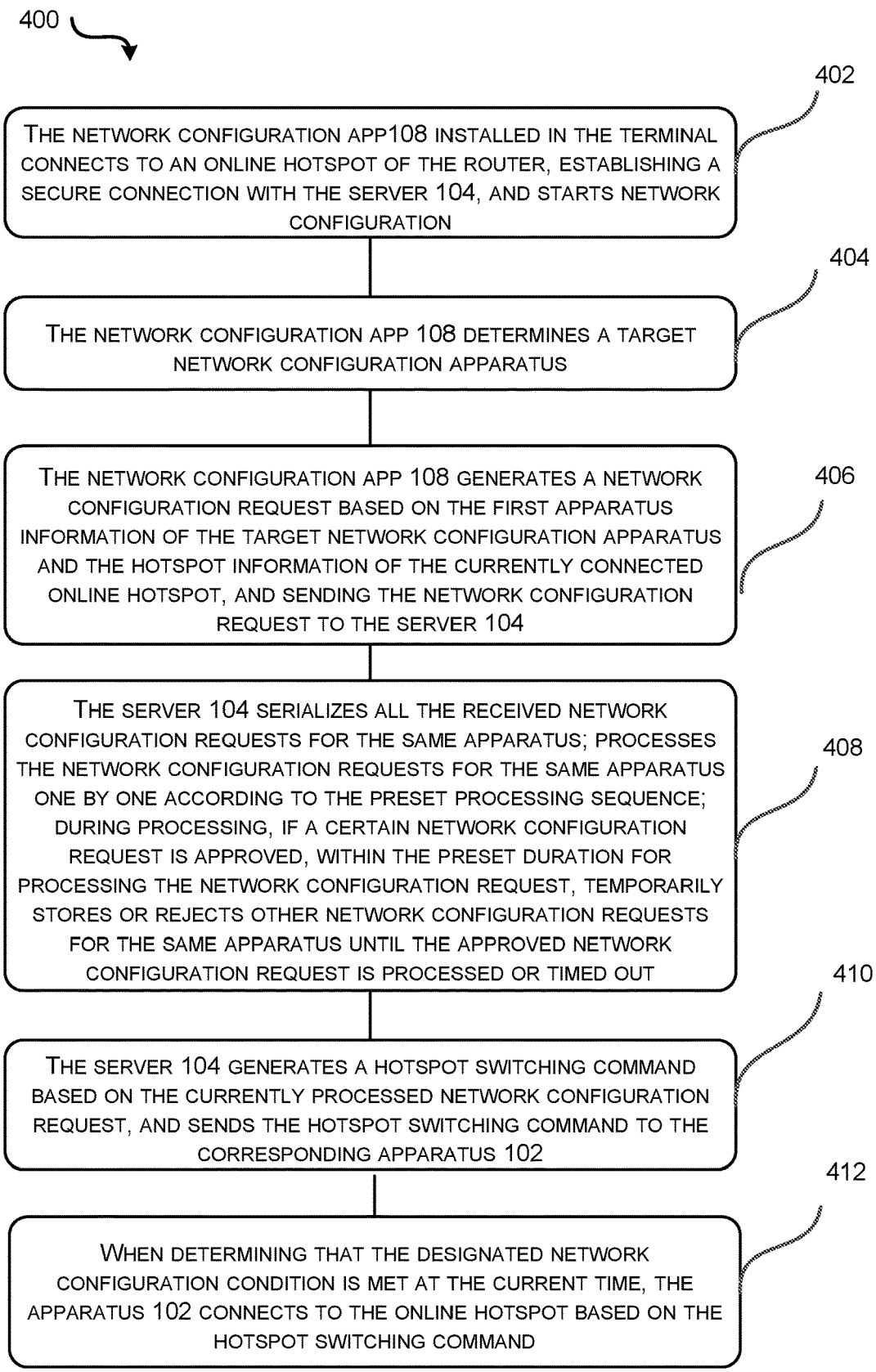
FIG. 4 is a flowchart of steps of an example embodiment of a process of network configuration of an apparatus of the present disclosure.

Referring to FIG. 4, a flow chart of steps of an example embodiment of a process 400 of network configuration of an apparatus is shown, which may include the following steps.

At 402, the network configuration App 108 installed in the terminal connects to an online hotspot of the router, establishes a secure connection with the server 104, and starts network configuration.

It should be noted that the example embodiments of the present disclosure do not limit the specific terminal, which may include cell phones, computers, tablets, etc.

Before starting the network configuration, the terminal may connect to a default online hotspot of the router 106. In practice, in order to distinguish Wi-Fi for networking and Wi-Fi for network configuration, a hotspot different from the online hotspot may be set as the network configuration hotspot.

In implementations, the user may install the network configuration App 108 (also known as the vendor app) in the terminal to perform network configuration on the apparatus 102. The network configuration app108 requires the user to register and log in before using it. After logging in, the user ID and related operation permissions will be displayed.

Through the online hotspot, the network configuration App 108 may establish a secure connection with the server 104, where the secure connection may include a TLS connection.

In practice, in the process of establishing the secure connection between the network configuration App 108 and the server 104, the server 104 may check the legality of the user identity based on the user ID and related operation authority.

At 404, the network configuration App 108 determines a target network configuration apparatus.

In example embodiments of the present disclosure, the network configuration App 108 determining the target network configuration apparatus may include the following sub-steps:

Determining the hotspot information of the online hotspot; obtaining a to-be-network-configured apparatus list from the server side based on the hotspot information; displaying the to-be-network-configured apparatus list; and taking an apparatus in the to-be-network-configured apparatus list that is selected by the user as the target network configuration apparatus.

In implementations, as long as the terminal connects to the online hotspot of the router, the network configuration App 108 may call the system-related API to obtain the hotspot information, such as SSID, BSSID, etc., of the online hotspot.

Subsequently, the network configuration App 108 may obtain the to-be-network-configured apparatus list from the server 104 according to the BSSID.

In an example embodiment, the process that the server 104 determines the to-be-network-configured apparatus list may include the following steps:

Receiving the hotspot information of the online hotspot sent by the network configuration application, where the hotspot information of the online hotspot includes the BSSID of the online hotspot; matching the BSSID of the online hotspot with the BSSID in the network configuration hotspot list corresponding to all the apparatuses stored in the server to obtain the to-be-network-configured apparatus list; and sending the to-be-network-configured apparatus list to the network configuration application.

In an example embodiment, during the process of discovery of apparatuses, each apparatus 102 uploads the discovered network configuration hotspot list to the server, and each network configuration hotspot in the network configuration hotspot list contains BSSID. Therefore, the matching of the BSSID of the online hotspot may be performed in the network configuration hotspot list uploaded by all the apparatus stored in the server 104, and any apparatus corresponding to the network configuration hotspot matched with the BSSID of the online hotspot is taken as the apparatus needing network configuration. All the apparatuses needing network configuration form the to-be-network-configured apparatus list.

As an example, the list of apparatus needing network configuration may include one or more apparatuses needing network configuration, and the first apparatus information of each apparatus.

It should be noted that in the above-mentioned BSSID matching process, the BSSID of each network configuration hotspot in the network configuration hotspot list is matched with the BSSID of the online hotspot. During matching, if the BSSID of the network configuration hotspot is the same as the BSSID of the online hotspot, that the two BSSIDs match is determined. Or, even if the BSSID of the network configuration hotspot is inconsistent with the BSSID of the online hotspot, that the two BSSIDs match is determined if the two BSSIDs, for example, have at least one of the following correspondences:

The contents of the first 5 bytes of two BSSIDs are the same, and the content of the last byte of the BSSID of the network configuration hotspot is equal to the content of the last byte of the BSSID of the online hotspot plus or minus a constant; or The contents of the last 5 bytes of the two BSSIDs are the same, and the content of the first byte of the BSSID of the network configuration hotspot is equal to the content of the first byte of the BSSID of the online hotspot plus or minus a constant.

In addition to the above manners, other manners may also be used to determine whether the BSSID of the network configuration hotspot is consistent with the BSSID of the online hotspot, which is not limited by example embodiments in the present disclosure.

After obtaining the to-be-network-configured apparatus list, the server 104 may send the to-be-network-configured apparatus list to the network configuration App 108, and the network configuration App 108 displays the to-be-network-configured apparatus list to the user, and guides the user to select an apparatus from the to-be-network-configured apparatus list as the target network configuration apparatus.

At 406, the network configuration App 108 generates a network configuration request based on the first apparatus information of the target network configuration apparatus and the hotspot information of the currently connected online hotspot, and sends the network configuration request to the server 104.

In implementations, after the user selects the target network configuration apparatus that needs network configuration, the network configuration App 108 may also guide the user to input the PASSWD of the online hotspot.

After receiving the PASSWD of the online hotspot input by the user, the network configuration App 108 may generate a network configuration request based on the first apparatus information of the target network configuration apparatus and the hotspot information (i.e., router information, including SSID, PASSWD, BSSID, etc.) of the currently connected online hotspot, and send the network configuration request to the server 104 to request the server 104 to perform network configuration on the apparatus.

At 408, the server 104 serializes all the received network configuration requests for the same apparatus; processes the network configuration requests for the same apparatus one by one according to the preset processing sequence; during processing, if a certain network configuration request is approved, within the preset duration for processing the network configuration request, temporarily stores or rejects other network configuration requests for the same apparatus until the approved network configuration request is processed or timed out.

In an example embodiment, after receiving the network configuration requests, the server 104 may serialize the network configuration requests for the same apparatus 102 to solve the problem that multiple users perform network configuration on the same apparatus at the same time, and to allow multiple users to perform network configuration on different apparatuses at the same time.

In an example embodiment, when multiple users simultaneously perform network configuration on the same apparatus, the following methods may be used.

According to the preset processing sequence, the network configuration requests for the same apparatus are processed one by one. During processing, if a certain network configuration request is approved, within the preset duration for processing the network configuration request, other network configuration requests for the same apparatus will be temporarily stored or rejected until the approved network configuration request is processed or timed out.

In an example embodiment, the preset processing sequence may include a first-come-first-served sequence. In an example embodiment, when receiving at least two network configuration requests for the same apparatus, the server 104 may approve the network configuration requests for the same apparatus one by one according to a first-come-first-served rule.

Further, after the server 104 approves a network configuration request for a certain apparatus, a network configuration window for the current apparatus may be opened in the server 104, and within the preset duration for processing the approved network configuration request, other network configuration requests for the same apparatus are temporarily stored or rejected, until the currently approved network configuration request is processed or timed out.

In an example embodiment, the preset duration for processing the approved network configuration request may be the effective duration of the opened network configuration window. For example, the effective duration is set as 60 seconds.

At 410, the server 104 generates a hotspot switching command based on the currently processed network configuration request, and sends the hotspot switching command to the corresponding apparatus 102.

In an example embodiment, when approving the network configuration request, the server 104 may generate a hotspot switching command for the currently approved network configuration request.

In example embodiments of the present disclosure, the server 104 generates a hotspot switching command based on the currently processed network configuration request, which may further include the following sub-steps:

When the network configuration request is approved, generating network configuration approval information; when the network configuration request is rejected, generating network configuration rejection information; generating network configuration response information based on the network configuration approval information or the network configuration rejection information, and sending the network configuration response information to the network configuration application; receiving network configuration preparation information sent by the network configuration application based on the network configuration approval information; and generating the hotspot switching command according to the network configuration preparation information.

In an example embodiment, according to the processing sequence, when rejecting a certain network configuration request, the server 104 may generate network configuration rejection information, and return the network configuration rejection information as the network configuration response information to the network configuration App 108 that sends the network configuration request, wherein the network configuration rejection information is configured to prompt the user not to operate the current apparatus.

After receiving the network configuration rejection information, the network configuration app 10 prompts the current user that other users are performing network configuration on the current apparatus and warn the user not to operate the apparatus.

Correspondingly, when approving a certain network configuration request, the server 104 may generate the network configuration approval information, and return the network configuration approval information as the network configuration response information to the network configuration App 108 that sends the network configuration request, wherein the network configuration approval information is configured to prompt the user to perform a touch operation on the apparatus, that is, the network configuration approval information may include instruction information of user touch operation.

After receiving the network configuration approval information, the network configuration App 108 displays the network configuration approval information to prompt the user to start the network configuration operation and guide the user to touch the apparatus 102.

It should be noted that the example embodiments of the present disclosure do not limit the touch operation that the user performs on the apparatus 102, as long as the touch operation may make the apparatus 102 enter the network configuration mode. For example, the touch operation may be an operation of touching a network configuration button of the touch apparatus 102, and the like.

The touch operation performed by the user on the apparatus 102 may make the apparatus 102 enter a network configuration mode. In the network configuration mode, the apparatus 102 opens the network configuration window on the apparatus side and starts the network configuration window, wherein the effective duration of the network configuration window is the preset duration.

After the user performs the touch operation, a completion operation may be performed in the network configuration App 108 to notify the network configuration App 108 that the touch operation is completed. After detecting the completion of the operation, the network configuration App 108 may determine that the user has performed the touch operation on the apparatus 102. At this time, the network configuration App 108 may generate the network configuration preparation information, and send the network configuration preparation information to the server 104 to notify the server 104 that the apparatus 102 that needs network configuration has entered a network configuration state, wherein the network configuration preparation information may include apparatus information of the apparatus 102.

After receiving the network configuration preparation information and determining that the apparatus 102 has entered the network configuration mode, the server 104 may start the network configuration window and generate the hotspot switching command.

It should be noted that the apparatus only supports the command to switch AP within the effective duration of the network configuration window.

As an example, the hotspot switching command may include hotspot information, such as SSID, PASSWD, BSSID, etc., of the online hotspot.

After generating the hotspot switching command, the server sends the hotspot switching command to the corresponding apparatus 102 through a secure connection.

At 412, when determining that the designated network configuration condition is met at the current time, the apparatus 102 connects to the online hotspot based on the hotspot switching command.

In an example embodiment, after receiving the hotspot switching command, the apparatus 102 may first detect whether the designated network configuration condition is met at the current time.

When determining that the designated network configuration condition is not met at the current time, the apparatus 102 generates network configuration error information, and sends the network configuration error information to the server 104 to notify the server 104 of a network configuration timeout or error.

When determining that the designated network configuration condition is met at the current time, the apparatus 102 may access the online hotspot according to the hotspot information, such as SSID, PASSWD, BSSID, etc., of the online hotspot to complete the switch from the network configuration hotspot to the online hotspot.

As an example, the designated network configuration condition may at least include the following condition:

The apparatus enters the network configuration mode, and the duration of entering the network configuration mode does not exceed the preset duration.

In an example embodiment, after receiving the hotspot switching command, the apparatus 102 checks whether it is in the network configuration mode and whether its network configuration window exceeds the effective duration. The apparatus only supports the command of switching APP when it is in the network configuration mode and within the effective duration of the network configuration window, that is, the designated network configuration condition is met.

So far, the process of network configuration of apparatus is completed.

III. Process of Binding of Apparatus

Figure 5:
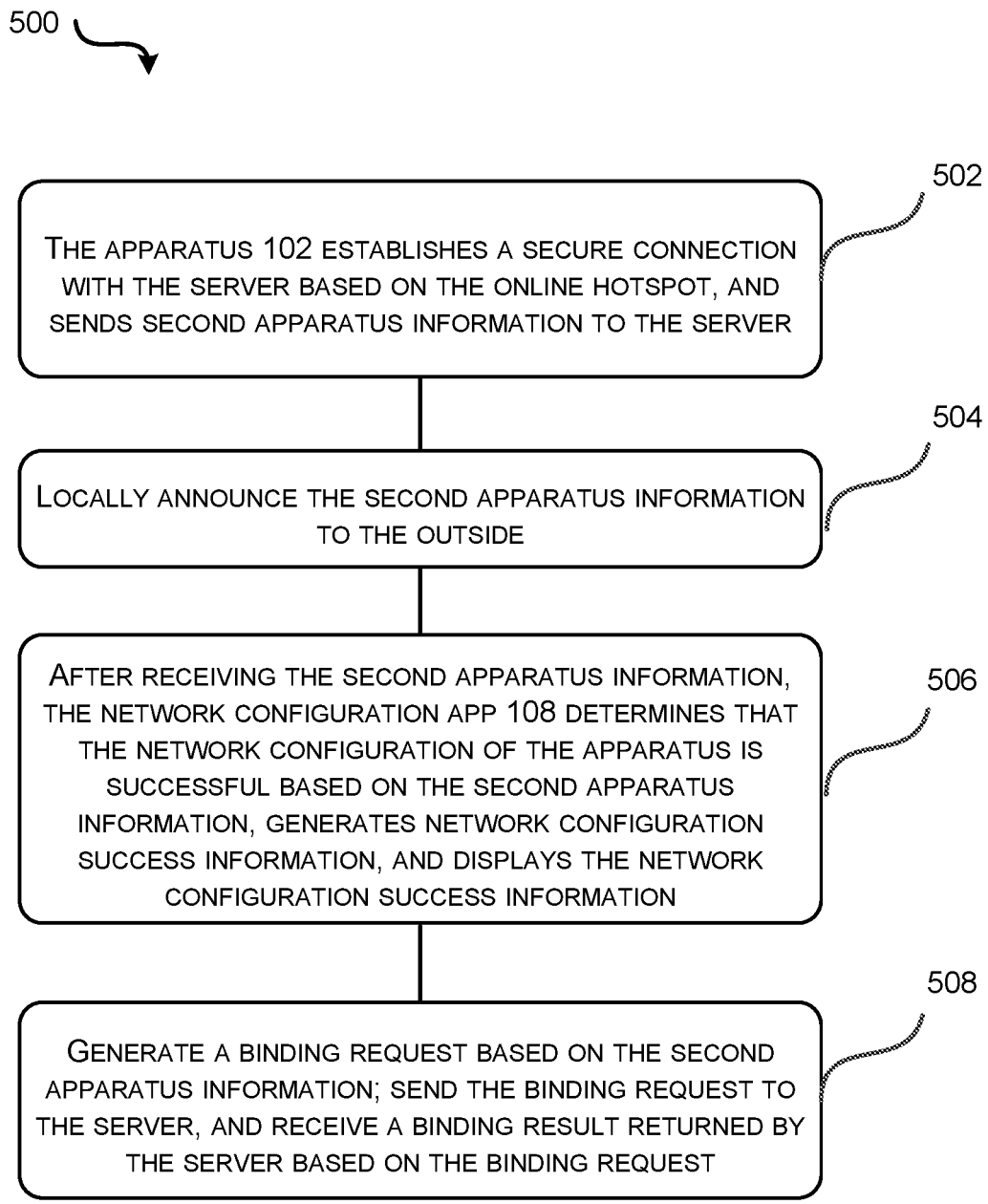
FIG. 5 is a flowchart of steps of an example embodiment of a process of binding of an apparatus of the present disclosure.

Referring to FIG. 5, a flowchart of steps of an example embodiment of the process 500 of binding of apparatus is shown, which may include the following steps.

At 502, the apparatus 102 establishes a secure connection with the server based on the online hotspot, and sends second apparatus information to the server.

After switching to the online hotspot, the apparatus 102 establishes a secure connection between the apparatus 102 and the server 104 based on the online hotspot, where the secure connection may include a TLS connection.

After switching to the online hotspot, the apparatus 102 may also obtain the second apparatus information. As an example, the second apparatus information may include the first apparatus information and a token of the apparatus 102.

After obtaining the second apparatus information, the apparatus 102 may report the second apparatus information to the server 104 through a secure connection with the server 104.

At 504, locally announcing the second apparatus information to the outside.

After obtaining the second apparatus information, the apparatus 102 may also announce the second apparatus information to the outside locally, indicating that the network configuration is successful.

At 506, after receiving the second apparatus information, the network configuration App 108 determines that the network configuration of the apparatus is successful based on the second apparatus information, generates network configuration success information, and displays the network configuration success information.

After receiving the second apparatus information announced by the apparatus 102, the network configuration App 108 determines that the network configuration of the apparatus 102 is successful. At this time, the network configuration App 108 may generate the network configuration success information and show the network configuration success information to the user to prompt the user that the network configuration is successful and guide the user to the process of binding.

It should be noted that when failing to receive the second apparatus information announced by the apparatus 102, the network configuration app108 may also actively query the second apparatus information locally. In implementations, the network configuration app108 may broadcast a query request locally to query the apparatus information, and the apparatus 102 replies with its own second apparatus information after receiving the query request.

At 508, generating a binding request based on the second apparatus information; sending the binding request to the server, and receiving a binding result returned by the server based on the binding request.

In an example embodiment, the network configuration app108 parses out the first apparatus information and the token according to the second apparatus information, and then uses the first apparatus information and the token to generate the binding request, and sends the binding request to the server 104 to request the server 104 to bind the second apparatus information and the corresponding apparatus.

In order to prevent the network configuration App 108 from maliciously binding apparatus, after receiving the first apparatus information and the token, the server 104 may match the token sent by the network configuration App 108 with the token reported by the apparatus 102. If the two tokens are the same, a binding operation is performed, and the corresponding binding result may be a binding success result. Otherwise, if the two tokens are different, the binding is rejected, and the corresponding binding result may be a binding failure result.

During the binding operation, the server 104 may bind the apparatus 102 according to the first apparatus information and the token, that is, generate the second apparatus information and a binding relationship of the apparatus. After the binding is completed, the server 104 returns the binding result to the network configuration App 108.

So far, the process of binding of apparatus is completed.

In the example embodiments of the present disclosure, a router is configured to assist the network configuration of apparatus, and the network configuration process and communication process are based on a reliable secure connection to ensure the security of sensitive data. In addition, the operations are simple for users, and the efficiency and the success rate of the network configuration are improved.

Figure 6:
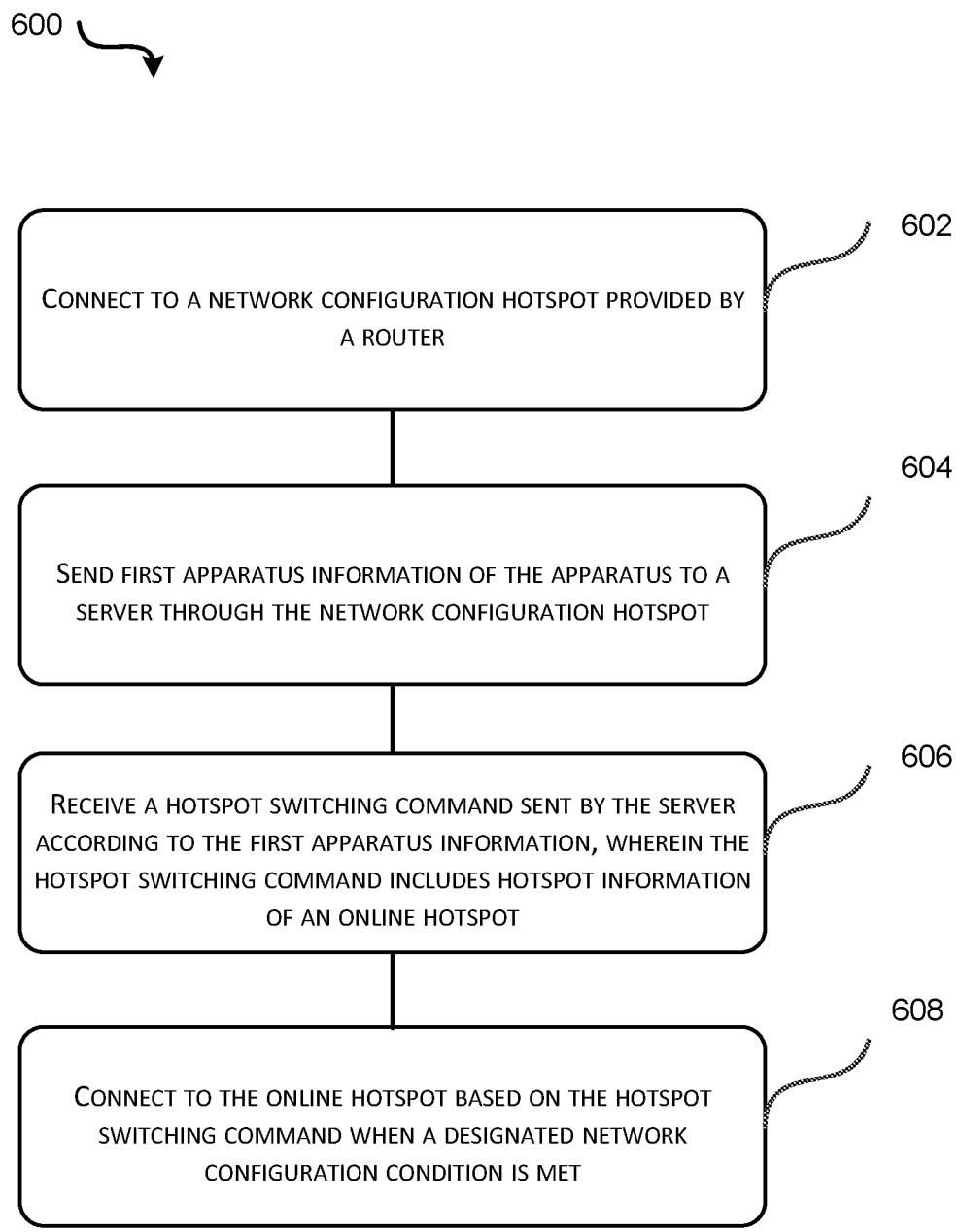
FIG. 6 is a flowchart of steps of an example embodiment of a method for performing network configuration on apparatus of the present disclosure.

Referring to FIG. 6, a flow chart of steps of an example embodiment of a method 600 for performing network configuration on apparatus of the present disclosure is shown. The example embodiment of the present disclosure is described from the apparatus side, which may include the following steps.

At 602, the apparatus connects to a network configuration hotspot provided by a router.

At 604, sending first apparatus information of the apparatus to a server through the network configuration hotspot.

At 606, receiving a hotspot switching command sent by the server according to the first apparatus information, wherein the hotspot switching command includes hotspot information of an online hotspot.

At 608, connecting to the online hotspot based on the hotspot switching command when a designated network configuration condition is met.

In example embodiments of the present disclosure, 602 may further include the following sub-steps.

At 6022, obtaining a network configuration hotspot list, wherein the network configuration hotspot list includes at least one network configuration hotspot and/or signal strength of the network configuration hotspot.

At 6024, connecting to the network configuration hotspot with the strongest signal strength.

At 6026, if the connecting fails, connecting to the network configuration hotspot with a second strongest signal strength until the connecting to the network configuration hotspot succeeds.

In example embodiments of the present disclosure, after 604, the example embodiments of the present disclosure may further include the following steps:

Sending a connection request to the server through the network configuration hotspot to establish a secure connection between the apparatus and the server;

Obtaining the first apparatus information of the apparatus;

Sending the first apparatus information and the network configuration hotspot list to the server.

In example embodiments of the present disclosure, before 604, the example embodiments of the present disclosure may further include the following steps:

When a touch operation of a user is detected, entering a network configuration mode.

In example embodiments of the present disclosure, the designated network configuration condition includes at least the following condition:

The apparatus entering the network configuration mode, and duration of entering the network configuration mode does not exceed a preset duration.

In example embodiments of the present disclosure, the example embodiments of the present disclosure may further include the following steps:

Generating network configuration error information when the designated network configuration condition is not met;

Sending the network configuration error information to the server.

In example embodiments of the present disclosure, after 608, the example embodiments of the present disclosure may further include the following steps:

Obtaining second apparatus information of the apparatus;

Announcing the second apparatus information to the outside locally, and/or establishing a secure connection with the server based on the online hotspot, and sending the second apparatus information to the server.

In the example embodiments of the present disclosure, the network configuration hotspot is provided by the router, the apparatus is firstly connected to the network configuration hotspot after powered on, and a secure connection with the corresponding server is established through the network configuration hotspot. Then the hotspot switching command from the server is received, the apparatus may be switched to the online hotspot according to the hotspot information of the online hotspot contained in the hotspot switching command, so as to complete the network configuration of the apparatus, which realizes the reliable connection of the network configuration process and improves the success rate of the network configuration of the apparatus.

Figure 7:
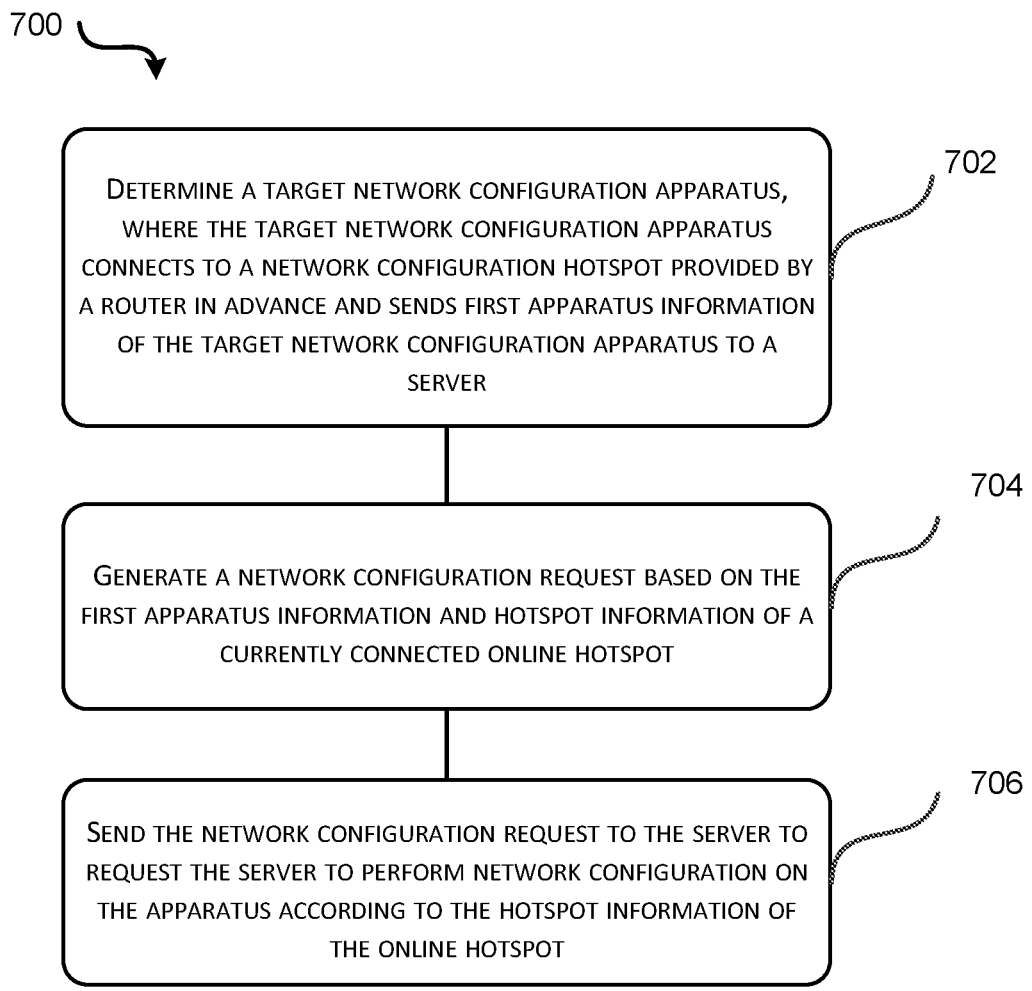
FIG. 7 is a flowchart of steps of another example embodiment of a method for performing network configuration on apparatus of the present disclosure.

Referring to FIG. 7, a flow chart of steps of another example embodiment of a method 700 for performing network configuration on apparatus of the present disclosure is shown. The example embodiments of the present disclosure are described from the network configuration application side, which may include the following steps:

At 702, the network configuration application determines a target network configuration apparatus, where the target network configuration apparatus connects to a network configuration hotspot provided by a router in advance and sends first apparatus information of the target network configuration apparatus to a server;

At 704, generating a network configuration request based on the first apparatus information and hotspot information of a currently connected online hotspot.

At 706, sending the network configuration request to the server to request the server to perform network configuration on the apparatus according to the hotspot information of the online hotspot.

In example embodiments of the present disclosure, after 706, the example embodiments of the present disclosure may further include the following steps:

Receiving network configuration response information returned by the server based on the network configuration request, wherein the network configuration response information includes network configuration approval information, and the network configuration approval information includes instruction information of user touch operation;

Displaying the network configuration approval information;

Upon determining that a user performs a touch operation based on the network configuration approval information, generating network configuration preparation information;

Sending the network configuration preparation information to the server to notify the server to perform the network configuration on the apparatus.

In example embodiments of the present disclosure, the network configuration response information further includes network configuration rejection information, and the method may further include the following steps:

Displaying the network configuration rejection information to prompt the user to prohibit operating the apparatus.

In example embodiments of the present disclosure, before 702, the example embodiments of the present disclosure may further include the following steps:

the network configuration application installed in the terminal connects to the online hotspot of the router and establishes a secure connection with the server.

In example embodiments of the present disclosure, 702 may further include the following sub-steps.

At 7022, determining the hotspot information of the online hotspot;

At 7024, obtaining a to-be-network-configured apparatus list from the server side based on the hotspot information, the to-be-network-configured apparatus list including one or more apparatus to be network-configured, and first apparatus information of the apparatus;

At 7026, displaying the to-be-network-configured apparatus list;

At 7028, setting the apparatus selected by a user in the to-be-network-configured apparatus list as the target network configuration apparatus.

In example embodiments of the present disclosure, the example embodiments of the present disclosure may further include the following steps:

Obtaining second apparatus information of the apparatus, wherein the second apparatus information is apparatus information after the network configuration of the apparatus succeeds;

Determining that the network configuration of the apparatus succeeds based on the second apparatus information;

Generating network configuration success information, and displaying the network configuration success information.

In example embodiments of the present disclosure, the obtaining of the second apparatus information of the apparatus may further include the following sub-steps:

Receiving the second apparatus information broadcast by the apparatus; or

Broadcasting a query request in local, and receiving the second apparatus information returned by the apparatus based on the query request.

In example embodiments of the present disclosure, the example embodiments of the present disclosure may further include the following steps:

Generating a binding request based on the second apparatus information;

Sending the binding request to the server to request the server to bind the second apparatus information and a corresponding apparatus;

Receiving a binding result returned by the server based on the binding request.

In the example embodiments of the present disclosure, after determining the target network configuration apparatus, the network configuration application connected to the online hotspot may actively obtain the hotspot information of the online hotspot and the first apparatus information of the target network configuration apparatus, generate a network configuration request according to the first apparatus Information and the hotspot information, and send the network configuration request to the server to request the server to perform the network configuration on the apparatus according to the hotspot information of the online hotspot. The network configuration process is more automated, which simplifies user operations, reduces the amount of information input by users, thereby reducing the probability of user input error, and improving the success rate and the efficiency of network configuration.

Figure 8:
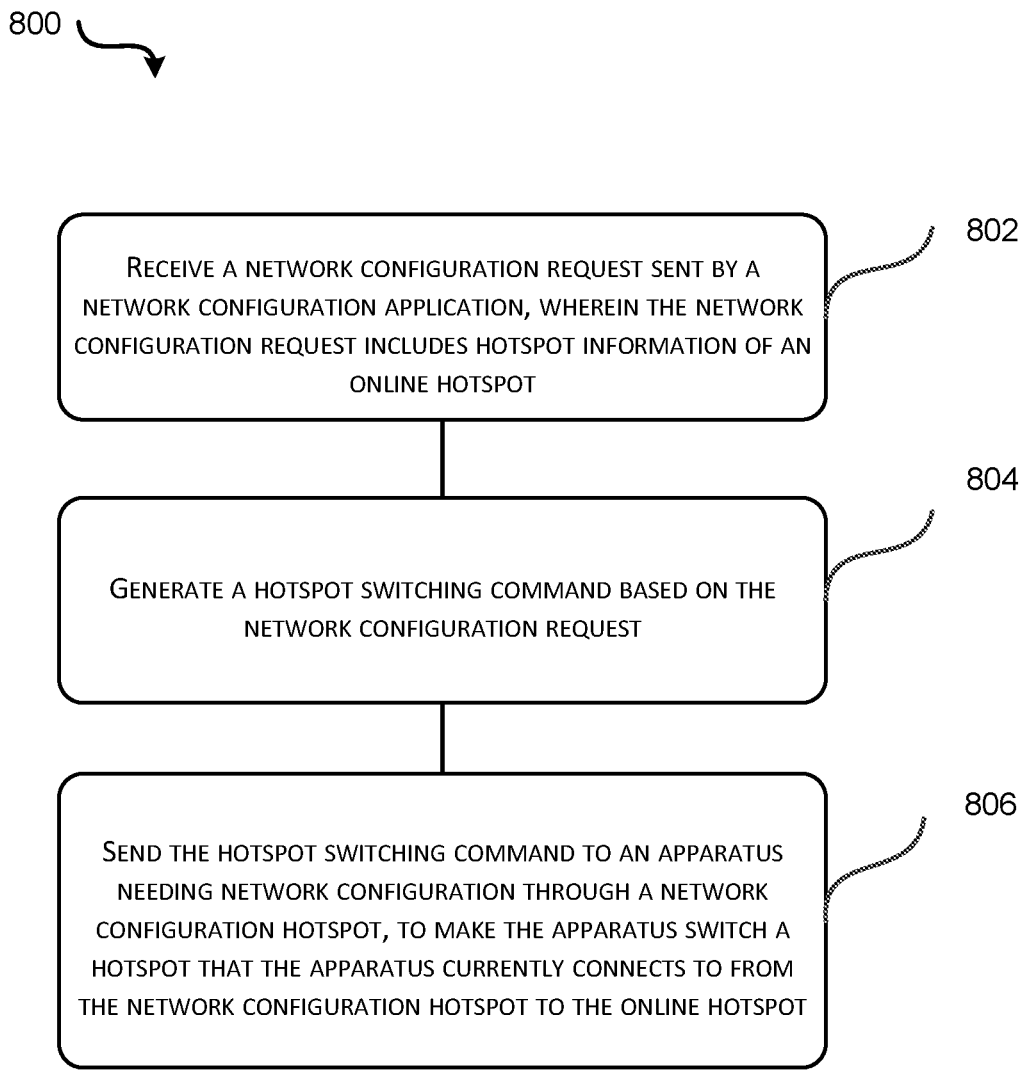
FIG. 8 is a flowchart of steps of another example embodiment of a method for performing network configuration on apparatus according to the present disclosure.

Referring to FIG. 8, a flow chart of steps of another example embodiment of a method 800 for performing network configuration on apparatus according to the present disclosure is shown. The example embodiments of the present disclosure are described from the server side, which may include the following steps.

At 802, receiving a network configuration request sent by a network configuration application, wherein the network configuration request includes hotspot information of an online hotspot.

At 804, generating a hotspot switching command based on the network configuration request.

At 808, sending the hotspot switching command to an apparatus needing network configuration through a network configuration hotspot, to make the apparatus switch a hotspot that the apparatus currently connects to from the network configuration hotspot to the online hotspot.

In example embodiments of the present disclosure, before 806, the example embodiments of the present disclosure may further include the following steps:

Establishing, by a server, a secure connection with the apparatus needing network configuration through the network configuration hotspot of a router;

Receiving first apparatus information sent by the apparatus and a network configuration hotspot list obtained by the apparatus;

Generating an association relationship between the first apparatus information and the network configuration hotspot list;

Saving the first apparatus information, the network configuration hotspot list, and the association relationship.

In example embodiments of the present disclosure, each network configuration hotspot in the network configuration hotspot list includes a basic service set identifier BSSID.

Before 802, the example embodiments of the present disclosure may further include the following steps:

Establishing a secure connection with the network configuration application through the online hotspot of a router;

Receiving the hotspot information of the online hotspot sent by the network configuration application, wherein the hotspot information of the online hotspot includes the BSSID of the online hotspot;

Matching the BSSID of the online hotspot with BSSIDs in the network configuration hotspot list corresponding to all apparatuses stored in the server to obtain a to-be-network-configured apparatus list;

Sending the to-be-network-configured apparatus list to be configured to the network configuration application.

In example embodiments of the present disclosure, after 802, the example embodiments of the present disclosure may further include the following steps:

Serializing all network configuration requests received for the same apparatus;

Processing the network configuration requests for the same apparatus one by one according to a preset processing sequence; during the processing, when a certain network configuration request is approved, temporarily storing or rejecting other network configuration requests for the same apparatus within a preset duration for processing the network configuration request until the approved network configuration request is processed or timed out.

In example embodiments of the present disclosure, 804 further includes the following sub-steps.

At 8042, generating network configuration approval information when the network configuration request is approved, wherein the network configuration approval information includes instruction information of user touch operation, and the network configuration approval information is configured to prompt the user to perform a touch operation on the apparatus.

At 8044, generating a network configuration rejection information when the network configuration request is rejected, wherein the network configuration rejection information is configured to prompt the user to prohibit operating the apparatus.

At 8046, generating network configuration response information based on the network configuration approval information or the network configuration rejection information, and sending the network configuration response information to the network configuration application;

At 8048, receiving network configuration preparation information sent by the network configuration application based on the network configuration approval information, wherein the network configuration preparation information is information generated after the network configuration application determining that the user performs the touch operation based on the network configuration approval information.

At 80410, generating the hotspot switching command according to the network configuration preparation information.

In example embodiments of the present disclosure, after the step 803, the example embodiments of the present disclosure may further include the following steps:

Receiving network configuration error information sent by the apparatus, wherein the network configuration error information is information generated when the apparatus determines that a designated network configuration condition is not met after receiving the hotspot switching command.

In example embodiments of the present disclosure, after 806, the example embodiments of the present disclosure may further include the following steps:

Determining that the network configuration of apparatus succeeds when second apparatus information sent by the apparatus is received;

Receiving a binding request sent by the network configuration application, wherein the binding request includes second apparatus information of the apparatus;

Upon determining that the second apparatus information sent by the apparatus is consistent with the second apparatus information sent by the network configuration application, generating a binding relationship between the second apparatus information and the apparatus, and returning a binding result to the network configuration application.

In the example embodiments of the present disclosure, during the process of network configuration of apparatus, the server may establish a secure connection with the apparatus through the network configuration hotspot, and establish a secure connection with the network configuration application through the online hotspot. When receiving the network configuration request containing the hotspot information of the online hotspot sent by the network configuration application, the server may generate a hotspot switching command according to the network configuration request and send the hotspot switching command to the apparatus to make the apparatus switch the currently connected hotspot from the network configuration hotspot to the online hotspot. The network configuration process establishes a reliable connection with the apparatus, which improves the success rate of the network configuration of the apparatus. Meanwhile, in combination with the network configuration application, the automation of the network configuration may be improved, user operations may be simplified, and the efficiency of the network configuration may be improved.

Figure 9:
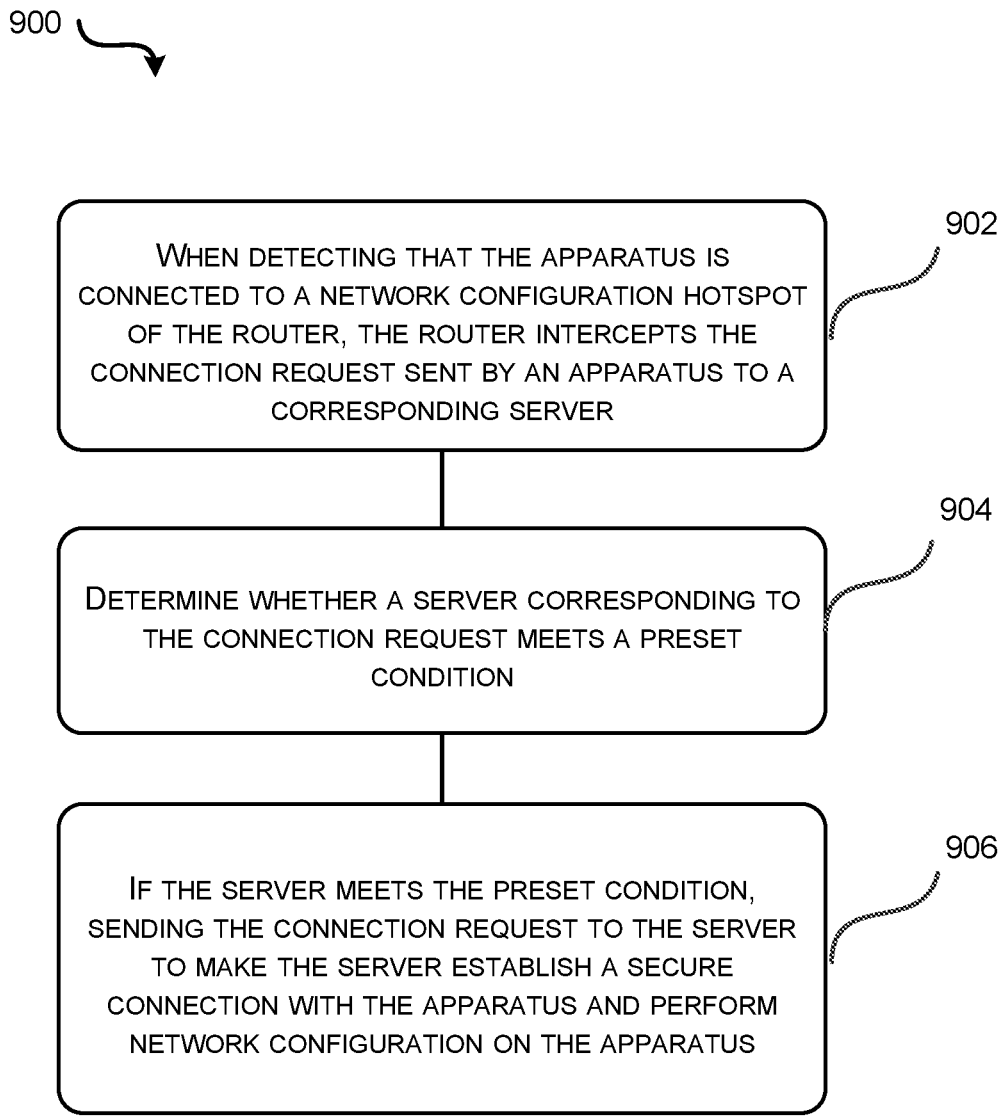
FIG. 9 is a flowchart of the steps of another example embodiment of a method for performing network configuration on apparatus of the present disclosure.

Referring to FIG. 9, a flowchart of steps of another example embodiment of a method for performing network configuration on apparatus of the present disclosure is shown. The example embodiments of the present disclosure are described from the router side, which may include the following steps.

At 902, when detecting that the apparatus is connected to a network configuration hotspot of the router, the router intercepts the connection request sent by an apparatus to a corresponding server.

At 904, determining whether a server corresponding to the connection request meets a preset condition.

At 906, if the server meets the preset condition, sending the connection request to the server to make the server establish a secure connection with the apparatus and perform network configuration on the apparatus.

In example embodiments of the present disclosure, the example embodiments of the present disclosure may further include the following steps:

Discarding the connection request if the server does not meet the preset condition.

In example embodiments of the present disclosure, 904 further includes the following sub-steps.

At 9042, determining vendor information of the server corresponding to the connection request.

At 9044, determining whether a vendor corresponding to the vendor information pays for a current network configuration service; if yes, determining that the server corresponding to the connection request meets the preset condition; if not, determining that the server corresponding to the connection request does not meet the preset condition.

In example embodiments of the present disclosure, before 902, the example embodiments of the present disclosure may further include the following steps:

After the router is powered on, turning on the network configuration hotspot, and setting the network configuration hotspot as a hidden hotspot.

In the example embodiments of the present disclosure, the router may realize the network configuration service by only turning on the network configuration hotspot, and the existing routers on the market basically do not need to be modified, making the network configuration solution of the example embodiments of the present disclosure very easy to promote.

When detecting that the apparatus is connected to the network configuration hotspot, the router may intercept the connection request sent by the apparatus to the corresponding server, and determine whether the server corresponding to the connection request meets the preset condition. When the server meets the preset condition, the router sends the connection request to the server to make the server establish a secure connection with the apparatus, and performs the network configuration on the apparatus to expand the business model of the network configuration by router.

The description of the example embodiments in FIG. 6-FIG. 9 may be relatively simple since they are basically similar to the method example embodiments in FIG. 2 to FIG. 5. For related details, reference may be made to the part of the description of the method example embodiments in FIG. 2 to FIG. 5.

It should be noted that for the method example embodiments, for the sake of simple description, they are all expressed as combinations of a series of actions, but those skilled in the art should know that the example embodiments of the present disclosure are not limited by the described sequence of actions, because according to the example embodiments, some steps may be performed in other order or at the same time. In addition, those skilled in the art should also be aware that the example embodiments described in the specification are merely exemplary embodiments, and the actions involved are not necessarily required for the example embodiments of the present disclosure.

Figure 10:
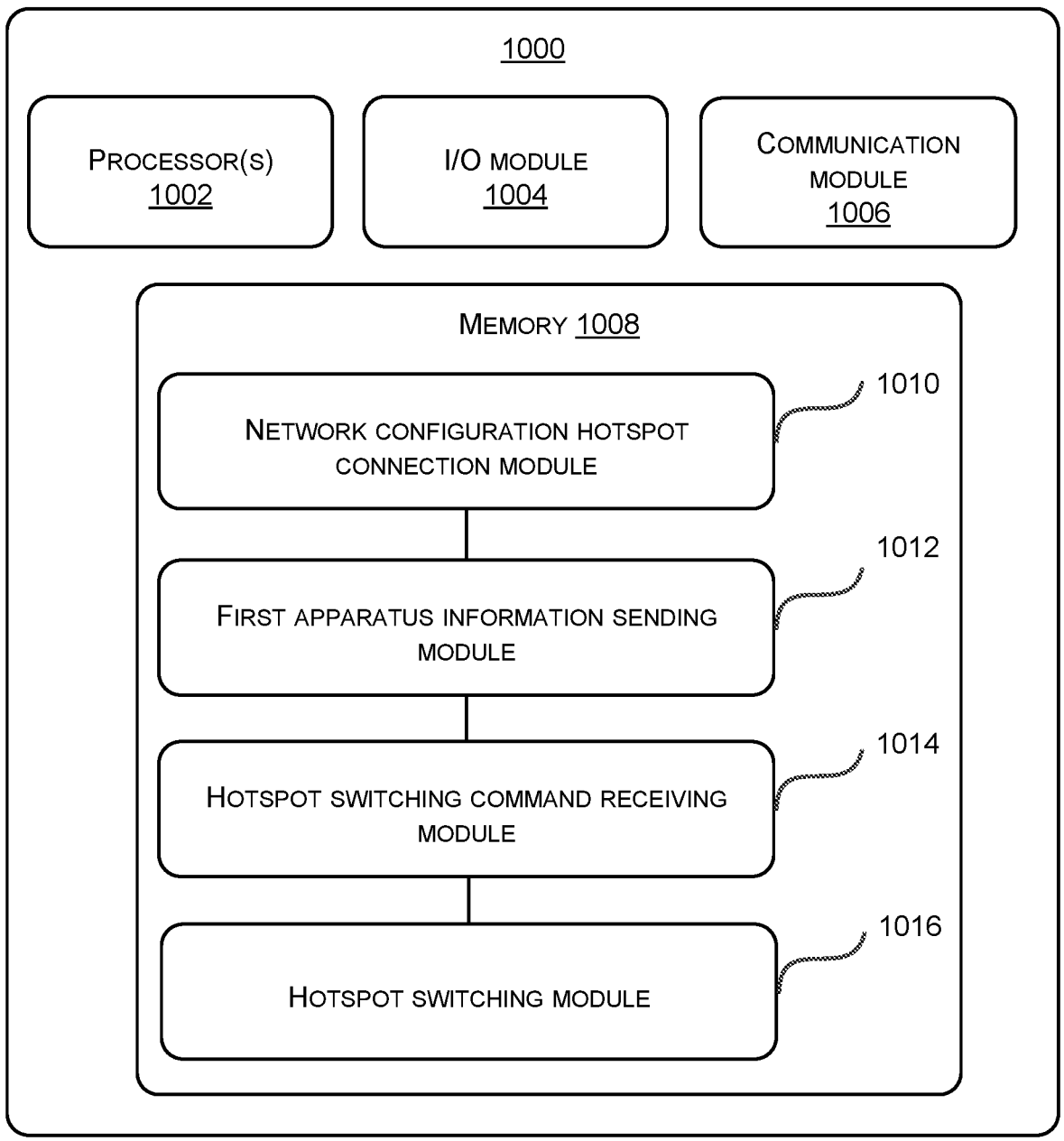
FIG. 10 is a structural block diagram of an example embodiment of an apparatus for performing network configuration of the present disclosure.

Referring to FIG. 10, a structural block diagram of an example embodiment of an apparatus 1000 for performing network configuration of the present disclosure is shown. As shown in FIG. 10, the apparatus 1000 may include one or more processors 1002, an input/output (I/O) module 1004, a communication module 1006, and a memory 1008. The input/output module 1004 is configured to receive data/signal to be processed and to output the processed data/signal. The communication module 1006 is configured to allow the apparatus 1000 to communicate with other devices (not shown) over a network (not shown). The memory 1008 stores thereon computer-executable modules executable by the one or more processors 1002. The computer-executable modules may include the following modules:

A network configuration hotspot connection module 1010 is configured to connect to a network configuration hotspot provided by a router;

A first apparatus information sending module 1012 is configured to send a first apparatus information of the apparatus to a server through the network configuration hotspot;

A hotspot switching command receiving module 1014 is configured to receive a hotspot switching command sent by the server according to the first apparatus information, where the hotspot switching command includes hotspot information of an online hotspot;

A hotspot switching module 1016 is configured to connect to the online hotspot based on the hotspot switching command when a designated network configuration condition is met.

In example embodiments of the present disclosure, the network configuration hotspot connection module 1010 may include the following sub-modules:

A network configuration hotspot list obtaining sub-module is configured to obtain a network configuration hotspot list, where the network configuration hotspot list includes at least one network configuration hotspot and/or the signal strength of the network configuration hotspot;

A network configuration hotspot connection sub-module is configured to connect to the network configuration hotspot with the strongest signal strength; and if the connecting fails, connect to the network configuration hotspot with a second strongest signal strength until the connecting to the network configuration hotspot succeeds.

In example embodiments of the present disclosure, the first apparatus information sending module 1012 may further include the following sub-modules:

A secure connection establishment sub-module is configured to send a connection request to the server through the network configuration hotspot to establish a secure connection with the apparatus and the server;

A first apparatus information obtaining sub-module is configured to obtain first apparatus information of the apparatus;

A first apparatus information sending sub-module is configured to send the first apparatus information and the network configuration hotspot list to the server.

In example embodiments of the present disclosure, the example embodiments of the present disclosure may also include the following modules:

A network configuration mode module is configured to enter the network configuration mode when a touch operation of a user is detected.

In example embodiments of the present disclosure, the designated network configuration conditions include at least the following condition:

The apparatus enters the network configuration mode, and the duration of entering the network configuration mode does not exceed the preset duration.

In example embodiments of the present disclosure, the example embodiments of the present disclosure may further include the following modules:

A network configuration error information generating module is configured to generate network configuration error information when the designated network configuration condition is not met; and send the network configuration error information to the server.

In example embodiments of the present disclosure, the example embodiments of the present disclosure may also include the following modules:

A second apparatus information obtaining module is configured to obtain second apparatus information of the apparatus;

A second apparatus information announcement module is configured to locally announce the second apparatus information to the outside; and/or A second apparatus information sending module is configured to establish a secure connection with the server based on the online hotspot, and send the second apparatus information to the server.

Figure 11:
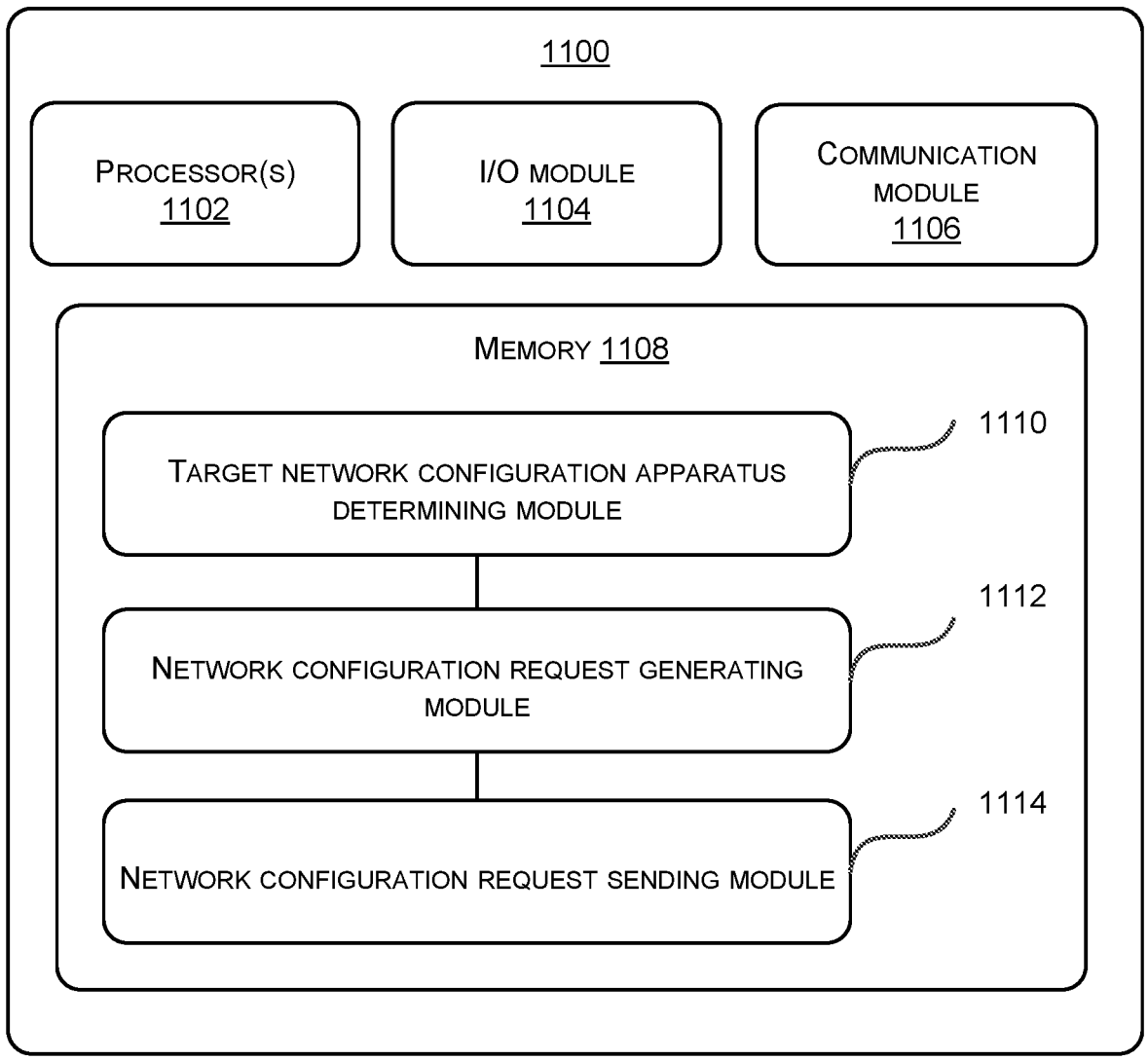
FIG. 11 is a structural block diagram of an example embodiment of a terminal for performing network configuration on apparatus of the present disclosure.

Referring to FIG. 11, a structural block diagram of an example embodiment of a terminal 1100 for performing network configuration on apparatus of the present disclosure is shown. As shown in FIG. 11, the terminal 1100 may include one or more processors 1102, an input/output (I/O) module 1104, a communication module 1106, and a memory 1108. The input/output module 1104 is configured to receive data/signal to be processed and to output the processed data/signal. The communication module 1106 is configured to allow the apparatus 1100 to communicate with other devices (not shown) over a network (not shown). The memory 1108 stores thereon computer-executable modules executable by the one or more processors 1102. The computer-executable modules may include the following modules:

A target network configuration apparatus determining module 1110 is configured to determine a target network configuration apparatus by using a network configuration application, wherein the target network configuration apparatus connects to a network configuration hotspot provided by a router in advance and sends first apparatus information of the target network configuration apparatus to a server;

A network configuration request generating module 1112 is configured to generate a network configuration request based on the first apparatus information and hotspot information of a currently connected online hotspot;

A network configuration request sending module 1114 is configured to send a network configuration request to the server to request the server to perform network configuration on the apparatus according to the hotspot information of the online hotspot.

In example embodiments of the present disclosure, the example embodiments of the present disclosure may further include the following modules:

A network configuration response information receiving module is configured to receive the network configuration response information returned by the server based on the network configuration request, where the network configuration response information includes the network configuration approval information, and the network configuration approval information includes instruction information of user touch operation;

A network configuration approval information display module is configured to display the network configuration approval information;

A network configuration preparation information generating module is configured to generate network configuration preparation information upon determining that the user performs a touch operation based on the network configuration approval information;

A network configuration preparation information sending module is configured to send the network configuration preparation information to the server to notify the server to perform network configuration on the apparatus.

In example embodiments of the present disclosure, the network configuration response information further includes network configuration rejection information, and the example embodiments of the present disclosure may further include the following modules:

A network configuration rejection information display module is configured to display the network configuration rejection information to prompt the user to prohibit operating the apparatus.

In example embodiments of the present disclosure, the example embodiments of the present disclosure may further include the following modules:

An online hotspot access module is configured to connect the network configuration application to the online hotspot of the router and establish a secure connection with the server.

In example embodiments of the present disclosure, the target network configuration apparatus determining module 1110 may include the following sub-modules:

A hotspot information determining sub-module is configured to determine the hotspot information of the online hotspot;

A to-be-network-configured apparatus list obtaining sub-module is configured to obtain the to-be-network-configured apparatus list from the server side based on the hotspot information, and the to-be-network-configured apparatus list includes one or more apparatuses to be network-configured, and the first apparatus information of the apparatus;

A to-be-network-configured apparatus list display sub-module is configured to display the to-be-network-configured apparatus list; and take the apparatus in the to-be-network-configured apparatus list that is selected by the user as the target network configuration apparatus.

In example embodiments of the present disclosure, the example embodiments of the present disclosure may further include the following modules:

A second apparatus information obtaining module is configured to obtain second apparatus information of the apparatus, where the second apparatus information is the apparatus information after the network configuration of the apparatus is successful;

A determining module configured to determine that the network configuration of the apparatus is successful based on the second apparatus information;

A network configuration success information generating module is configured to generate the network configuration success information and display the network configuration success information.

In example embodiments of the present disclosure, the second apparatus information obtaining module includes:

A second apparatus information receiving sub-module is configured to receive the second apparatus information broadcast by the apparatus; or A query request broadcasting sub-module is configured to broadcast the query request locally and receive the second apparatus information returned by the apparatus based on the query request.

In example embodiments of the present disclosure, the example embodiments of the present disclosure may further include the following modules:

A binding request generation module is configured to generate a binding request based on the second apparatus information;

A binding request sending module is configured to send the binding request to the server to request the server to bind the second apparatus information and the corresponding apparatus;

A binding result receiving module is configured to receive the binding result returned by the server based on the binding request.

Figure 12:
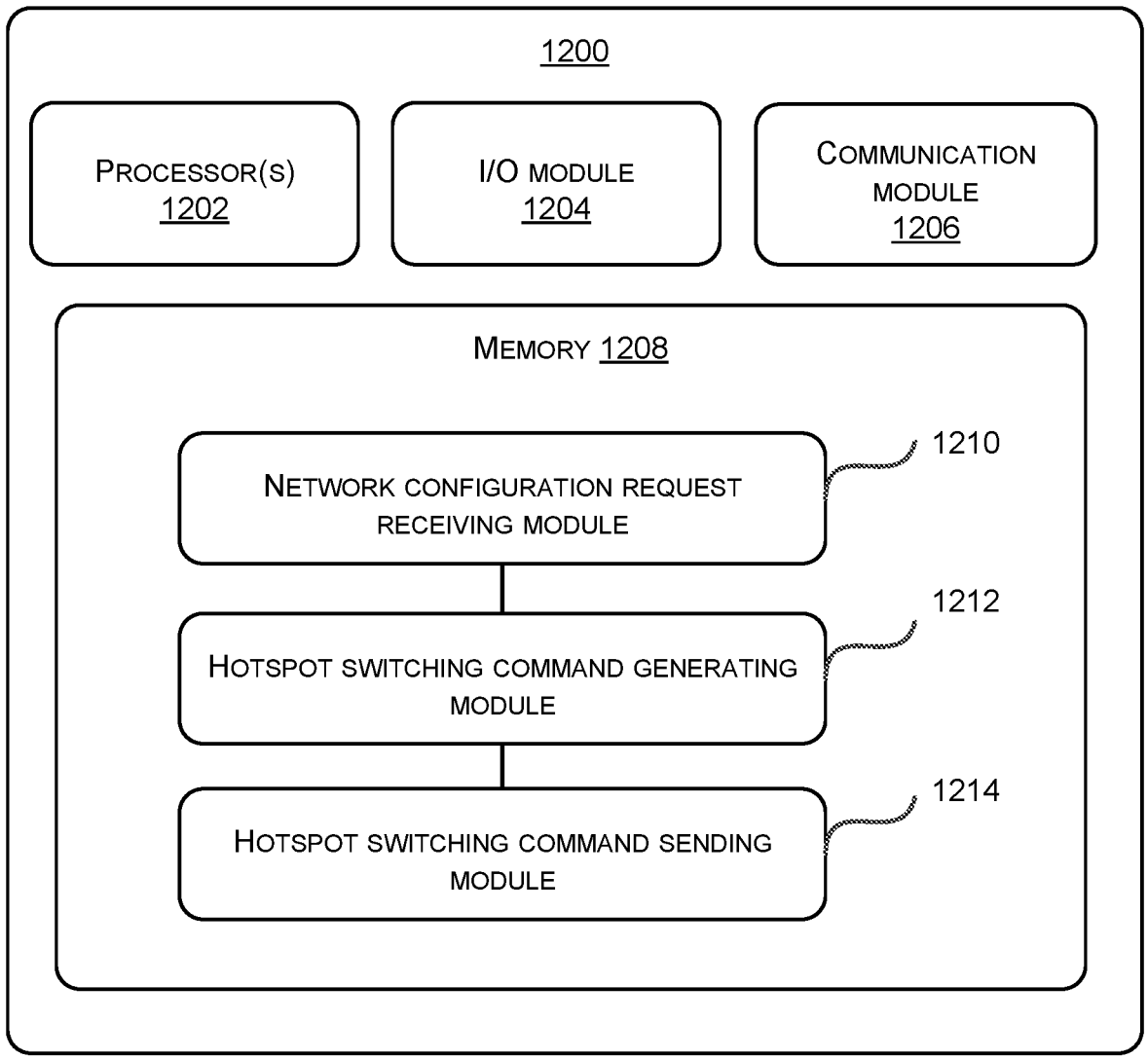
FIG. 12 is a structural block diagram of an example embodiment of a server for network configuration on apparatus according to the present disclosure.

Referring to FIG. 12, a structural block diagram of an example embodiment of a server for network configuration on apparatus 1200 according to the present disclosure is shown. As shown in FIG. 12, the apparatus 1200 may include one or more processors 1202, an input/output (I/O) module 1204, a communication module 1206, and a memory 1208. The input/output module 1204 is configured to receive data/signal to be processed and to output the processed data/signal. The communication module 1206 is configured to allow the apparatus 1200 to communicate with other devices (not shown) over a network (not shown). The memory 1208 stores thereon computer-executable modules executable by the one or more processors 1202. The computer-executable modules may include the following modules:

A network configuration request receiving module 1210 is configured to receive a network configuration request sent by a network configuration application, wherein the network configuration request includes hotspot information of an online hotspot;

A hotspot switching command generating module 1212 is configured to generate a hotspot switching command based on the network configuration request;

A hotspot switching command sending module 1214 is configured to send the hotspot switching command to an apparatus needing network configuration through a network configuration hotspot to make the apparatus switch a hotspot that the apparatus connects to from the network configuration hotspot to the online hotspot.

In example embodiments of the present disclosure, the example embodiments of the present disclosure may further include the following modules:

A first secure connection establishment module is configured to establish a secure connection with the apparatus needing network configuration through the network configuration hotspot of the router;

A first apparatus information receiving module is configured to receive the first apparatus information sent by the apparatus and the network configuration hotspot list obtained by the apparatus;

An association relationship generating module is configured to generate an association relationship between the first apparatus information and the network configuration hotspot list;

A saving module is configured to save the first apparatus information, the network configuration hotspot list, and the association relationship.

In example embodiments of the present disclosure, each network configuration hotspot in the network configuration hotspot list includes a basic service set identifier BSSID; the example embodiments of the present disclosure may also include the following modules:

A second secure connection establishment module is configured to establish a secure connection with the network configuration application through the online hotspot of the router;

A hotspot information receiving module is configured to receive the hotspot information of the online hotspot sent by the network configuration application, where the hotspot information of the online hotspot includes the BSSID of the online hotspot;

A to-be-network-configured apparatus list obtaining module is configured to match the BSSID of the online hotspot with the BSSIDs in the network configuration hotspot list corresponding to all apparatuses stored in the server to obtain the to-be-network-configured apparatus list;

A to-be-network-configured apparatus list sending module is configured to send the to-be-network-configured apparatus list to the network configuration application.

In example embodiments of the present disclosure, the example embodiments of the present disclosure may further include the following modules:

A serialization processing module is configured to serialize all network configuration requests received for the same apparatus;

A network configuration request processing module is configured to process network configuration requests for the same apparatus one by one according to a preset processing sequence. During processing, if a certain network configuration request is approved, then within the preset duration for processing the network configuration, other network configuration requests for the same apparatus are temporarily stored or rejected until the approved network configuration request is processed or timed out.

In example embodiments of the present disclosure, the hotspot switching command generating module 1214 includes the following sub-modules:

A network configuration approval information generation sub-module is configured to generate network configuration approval information when the network configuration request is approved, where the network configuration approval information includes instruction information of user touch operation, and the network configuration approval information is configured to prompt the user to perform a touch operation on the apparatus;

A network configuration rejection information generation sub-module is configured to generate network configuration rejection information when the network configuration request is rejected, and the network configuration rejection information is configured to prompt the user to prohibit operating the apparatus;

A network configuration response information generation sub-module is configured to generate network configuration response information based on the network configuration approval information or the network configuration rejection information, and send the network configuration response information to the network configuration application;

A network configuration preparation information receiving sub-module is configured to receive network configuration preparation information sent by the network configuration application based on the network configuration approval information, where the network configuration preparation information is information that is generated after the network configuration application determines that the user performs a touch operation based on the network configuration approval information;

A hotspot switching command generation sub-module is configured to generate the hotspot switching command according to the network configuration preparation information.

In example embodiments of the present disclosure, the example embodiments of the present disclosure may also include the following modules:

A network configuration error information receiving module is configured to receive network configuration error information sent by the apparatus, where the network configuration error information is information generated after the apparatus receives the hotspot switching command and that the designated network configuration condition is not met is determined.

In example embodiments of the present disclosure, the example embodiments of the present disclosure may further include the following modules:

A second apparatus information receiving module is configured to determine that the network configuration of the apparatus is successful when the second apparatus information sent by the apparatus is received;

A binding request receiving module is configured to receive a binding request sent by a network configuration application, where the binding request includes the second apparatus information of the apparatus;

A binding module is configured to, upon determining that the second apparatus information sent by the apparatus is consistent with the second apparatus information sent by the network configuration application, generate the second apparatus information and the binding relationship of the apparatus, and return the binding result to the network configuration application.

Figure 13:
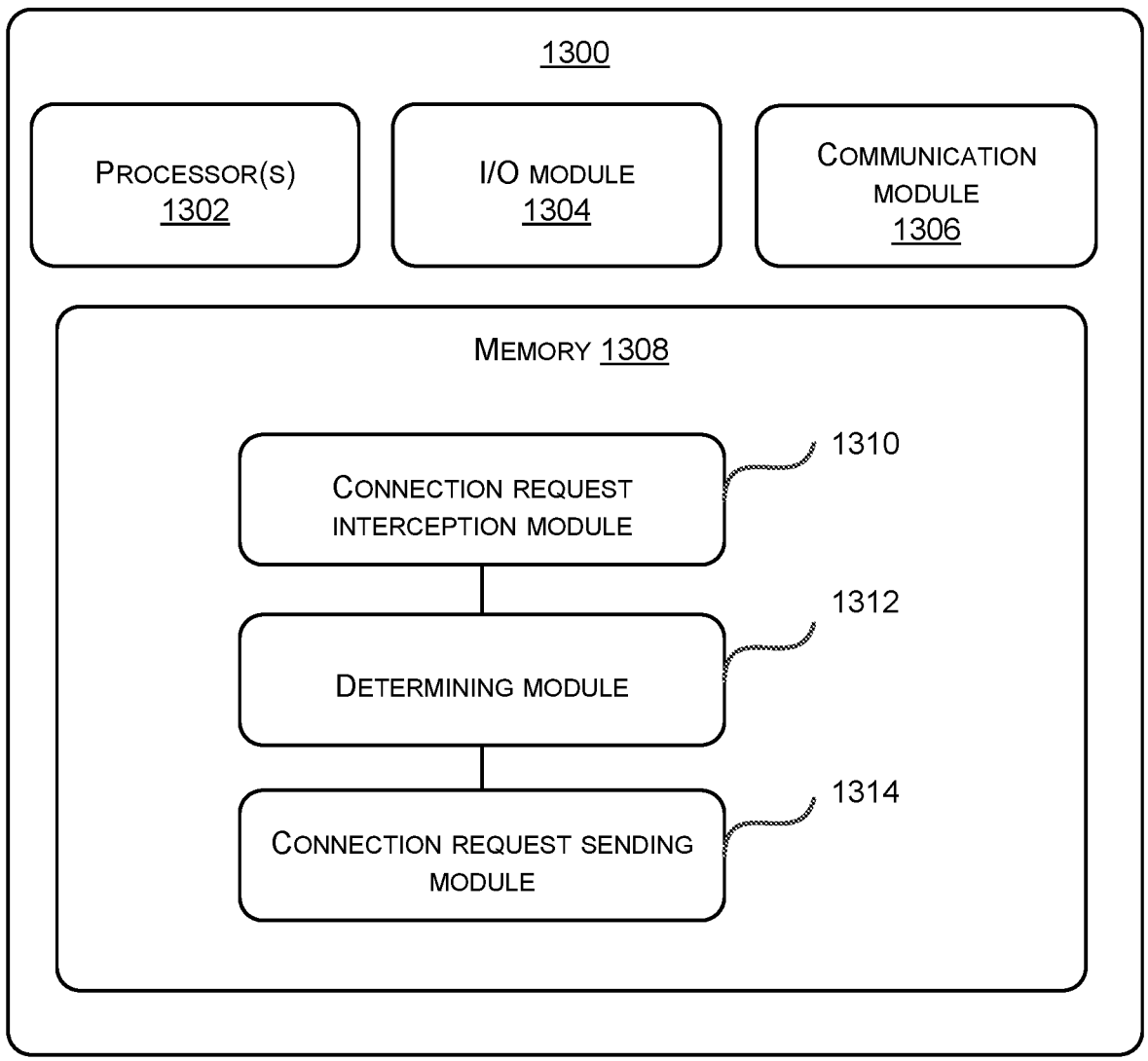
FIG. 13 is a structural block diagram of an example embodiment of a router for performing network configuration on apparatus of the present disclosure.

Referring to FIG. 13, a structural block diagram of an example embodiment of a router 1300 for performing network configuration on apparatus of the present disclosure is shown. As shown in FIG. 13, the router 1300 may include one or more processors 1302, an input/output (I/O) module 1304, a communication module 1306, and a memory 1308. The input/output module 1304 is configured to receive data/signal to be processed and to output the processed data/signal. The communication module 1306 is configured to allow the apparatus 1300 to communicate with other devices (not shown) over a network (not shown). The memory 1308 stores thereon computer-executable modules executable by the one or more processors 1302. The computer-executable modules may include the following modules:

A connection request interception module 1310 is configured to intercept a connection request sent by an apparatus to a corresponding server when a router detects that the apparatus connects to a network configuration hotspot of the router;

A determining module 1312 is configured to determine whether a server corresponding to the connection request meets a preset condition;

A connection request sending module 1314 is configured to send the connection request to the server when the server meets the preset condition to make the server establish a secure connection with the apparatus, and perform network configuration on the apparatus.

In example embodiments of the present disclosure, the example embodiments of the present disclosure may also include the following modules:

A request discarding module is configured to discard the connection request if the server does not meet the preset condition.

In example embodiments of the present disclosure, the determining module 1312 includes:

A vendor information determining sub-module is configured to determine the vendor information of the server corresponding to the connection request;

A vendor information determining sub-module is configured to determine whether the vendor corresponding to the vendor information pays for the current network configuration service; if so, that the server corresponding to the connection request meets the preset condition is determined; if not, that the server corresponding to the connection request does not meet the preset condition is determined.

In example embodiments of the present disclosure, the example embodiments of the present disclosure may further include the following modules:

A network configuration hotspot activation module is configured to, after the router is powered on, enable the network configuration hotspot, and set the network configuration hotspot as a hidden hotspot.

The description of the example embodiments shown in FIG. 10-FIG. 13 may be relatively simple since they are basically similar to the above-mentioned method example embodiments, and for related details, reference may be made to the part of the description of the method example embodiments.

Figure 14:
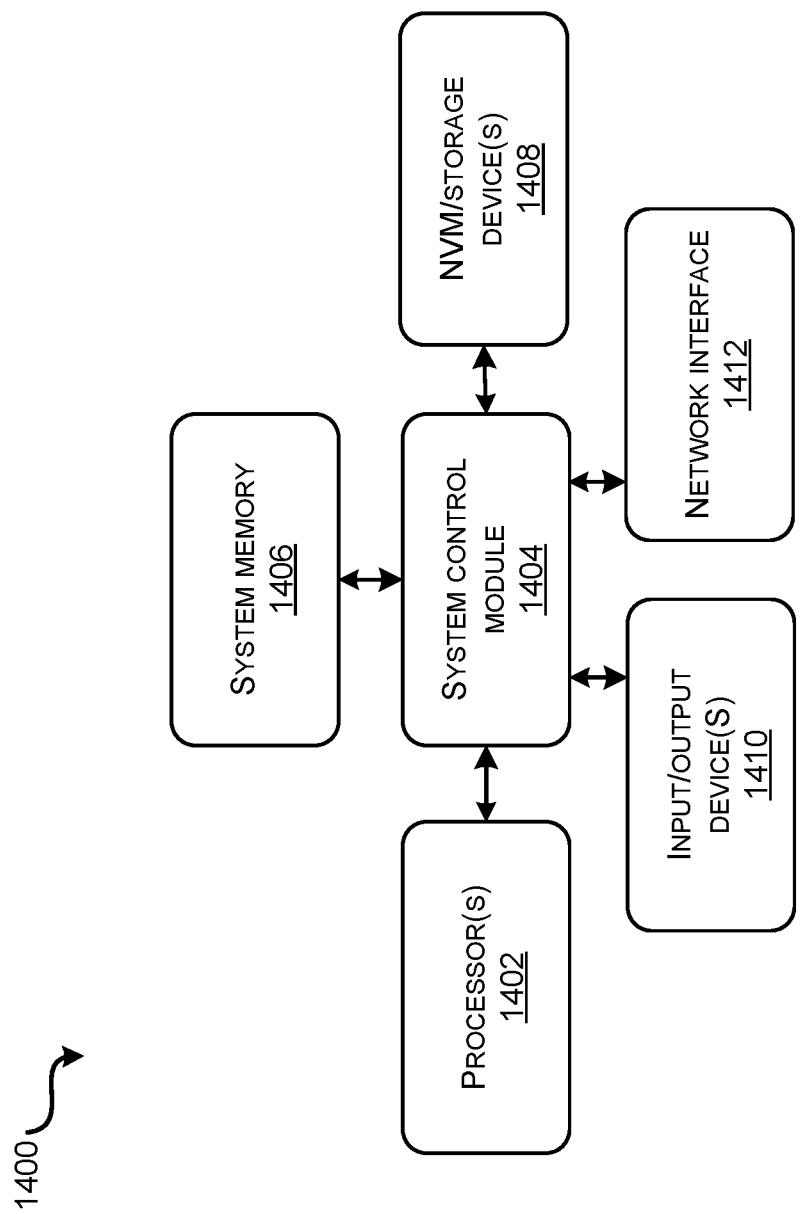
FIG. 14 is a schematic structural diagram of an example embodiment of a system of the present disclosure.

The example embodiments of the present disclosure may be implemented as a system that uses any appropriate hardware, firmware, software, or any combination thereof to perform a desired configuration. FIG. 14 schematically illustrates an exemplary system (or device) 1400 that may be used to implement the various example embodiments described in this disclosure.

For an example embodiment, FIG. 14 shows an exemplary system 1400 having one or more processors 1402, at least one system control module (chipset) 1404 coupled to at least one of the processors 1402, a system memory 1406 coupled to the system control module 1404, a non-volatile memory (NVM)/storage apparatus 1408 coupled to the system control module 1404, one or more input/output devices 1410 coupled to the system control module 1404, and a network interface 1412 coupled to the system control module 1404.

The processor 1402 may include one or more single-core or multi-core processors, and the processor 1402 may include any combination of a general-purpose processor or a dedicated processor (for example, a graphics processor, an application processor, a baseband processor, etc.). In some example embodiments, the system 1400 may serve as the data platform described in the example embodiments of the present disclosure.

In some example embodiments, the system 1400 may include one or more computer-readable media with instructions (for example, system memory 1406 or NVM/storage devices 1408) and one or more processors 1402 combined with the one or more computer-readable media to be configured to execute the instructions to implement modules to perform the actions described in this disclosure.

For example embodiments, the system control module 1404 may include any suitable interface controller to provide any suitable interface to at least one of the processor(s) 1402 and/or any suitable apparatuses or components that communicate with the system control module 1404.

The system control module 1404 may include a memory controller module to provide an interface to the system memory 1406. The memory controller module may be a hardware module, a software module, and/or a firmware module.

The system memory 1406 may be used to load and store data and/or instructions for the system 1400, for example. For an example embodiment, the system memory 1406 may include any suitable volatile memory, for example, a suitable DRAM. In some example embodiments, the system memory 1406 may include a double data rate type quad synchronous dynamic random access memory (DDR7 SDRAM).

For example embodiments, the system control module 1404 may include one or more input/output controllers to provide interfaces to the NVM/storage device(s) 1408 and the input/output apparatus 1410 (one or more).

For example, the NVM/storage device(s)1408 may be used to store data and/or instructions. The NVM/storage device(s)1408 may include any suitable non-volatile memory (e.g., flash memory) and/or may include any suitable (one or more) non-volatile storage apparatuses (e.g., one or more hard drives (HDD), one or more compact disc (CD) drives and/or one or more digital versatile disc (DVD) drives).

The NVM/storage apparatus 1408 may include storage resources that are physically part of the apparatus on which the system 1400 is installed, or it may be accessed by the apparatus and does not have to be a part of the apparatus. For example, the NVM/storage device(s)1408 may be accessed through the input/output device(s)1410 through the network.

The input/output device(s)1410 may provide an interface for the system 1400 to communicate with any other suitable apparatus. The input/output device(s)1410 may include communication components, audio components, sensor components, and the like. The network interface 1412 may provide an interface for the system 1400 to communicate through one or more networks. The system 1400 may communicate with one or more of the wireless network standards and/or protocols according to any of the one or more wireless network standards and/or protocols. The components perform wireless communication, such as connecting to wireless networks based on communication standards, such as Wi-Fi, 2G, or 3G, or a combination of them for wireless communication.

For an example embodiment, at least one of the processor(s) 1402 may be packaged with the logic of one or more controllers of the system control module 1404 (for example, a memory controller module). For an example embodiment, at least one of the processor(s) 1402 may be packaged with the logic of one or more controllers of the system control module 1404 to form a system in package (SiP). For an example embodiment, at least one of the processor(s) 1402 and the logic of one or more controllers of the system control module 1404 may be integrated on the same mold. For an example embodiment, at least one of the processor(s) 1402 and the logic of one or more controllers of the system control module 1404 may be integrated on the same mold to form a system on chip (SoC).

In each example embodiment, the system 1400 may be, but is not limited to a browser, a workstation, a desktop computing apparatus, or a mobile computing apparatus (for example, a laptop computing apparatus, a handheld computing apparatus, a tablet computer, a netbook, etc.). In an example embodiment, the system 1400 may have more or fewer components and/or different architectures. For example, in some example embodiments, the system 1400 includes one or more cameras, keyboards, liquid crystal display (LCD) screens (including touch screen displays), non-volatile memory ports, multiple antennas, graphics chips, application-specific integrated circuits (ASIC) and speakers.

If the display includes a touch panel, the display screen may be implemented as a touch screen display to receive input signals from the user. The touch panel includes one or more touch sensors to sense touch, sliding, and gestures on the touch panel. The touch sensor may not only sense the boundary of a touch or slide action, but also detect the duration and pressure related to the touch or slide operation.

The example embodiments of the present disclosure also provide a non-volatile readable storage medium. The storage medium stores one or more modules (programs). When the one or more modules are applied to the terminal apparatus, the terminal apparatus execute the instructions for each step of the above-mentioned method in the example embodiments of the present disclosure.

In an example, an apparatus is provided, and the apparatus includes: one or more processors; and, one or more machine-readable media having instructions stored thereon, when executed by the one or more processors, causing the apparatus to execute the instructions of each step of the above-mentioned method in the example embodiments of the present disclosure.

Each example embodiment in this manual is described in a progressive manner. Each example embodiment focuses on the difference from other example embodiments. For the same and similar parts of each example embodiment, please refer to each other.

Those skilled in the art should understand that the example embodiments of the example embodiments of the present disclosure may be provided as clients, devices, or computer program products. Therefore, the example embodiments of the present disclosure may take the form of complete hardware embodiments, complete software embodiments, or embodiments that combine software and hardware. Moreover, the example embodiments of the present disclosure may take the form of computer program products implemented on one or more computer-usable storage media (including but not limited to disk storage, CD-ROM, optical storage, etc.) containing computer-usable program codes.

The example embodiments of the present disclosure are described with reference to the flowcharts and/or block diagrams of the client, terminal apparatus (system), and computer program products of the example embodiments of the present disclosure. It should be understood that each process and/or block in the flowchart and/or block diagram, and the combination of processes and/or blocks in the flowchart and/or block diagram may be realized by computer program instructions. These computer program instructions may be provided to the processor of a general-purpose computer, a special-purpose computer, an embedded processor or other programmable data processing terminal apparatus to generate a machine, so that the instructions executed by the processor of the computer or other programmable data processing terminal apparatus produce means for realizing the functions designated in one or more processes in the flowchart and/or one or more blocks in the block diagram.

These computer program instructions may also be stored in a computer-readable media that may guide a computer or other programmable data processing terminal apparatus to work in a manner that the instructions stored in the computer-readable media produce an article of manufacture including the instruction device. The instruction device implements the functions designated in one process or multiple processes in the flowchart and/or one block or multiple blocks in the block diagram.

The computer-readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

These computer program instructions may also be loaded on a computer or other programmable data processing terminal apparatus, so that a series of operation steps are executed on the computer or other programmable terminal apparatus to generate computer-implemented processing, so that the instructions executed on the computer or other programmable terminal apparatus provide steps for implementing functions designated in a flow or multiple flows in the flowchart and/or a block or multiple blocks in the block diagram.

Although the example embodiments of the present disclosure have been described, those skilled in the art may make additional changes and modifications to these example embodiments once they learn the present disclosure. Therefore, the appended claims are intended to be interpreted as including the example embodiments and all changes and modifications falling within the scope of the example embodiments of the present disclosure.

Finally, it should be noted that in this disclosure, relational terms such as first and second are only used to distinguish one entity or operation from another entity or operation, and do not necessarily require or imply that there is any such actual relationship or sequence between these entities or operations. Moreover, the terms "include", "comprise" or any other variants thereof are intended to cover non-exclusive inclusion, so that a process, client, item or terminal apparatus including a series of elements not only includes those elements, but also includes those elements that are not explicitly included. The other elements listed may also include elements inherent to this process, client, item, or terminal apparatus. Without more restrictions, the element defined by the sentence "including a . . . " does not exclude the existence of other same elements in the process, client, article, or terminal apparatus that includes the element.

The above provides a detailed introduction to the methods for network configuration and network configuration system for smart apparatuses provided by the present disclosure. Examples are used in this article to explain the principles and implementation of the present disclosure. The above description of example embodiments is only used to help understand the client and its core ideas of the present disclosure. Meanwhile, for those skilled in the art, according to the ideas of the present disclosure, there will be changes in implementations and scope of application. In summary, the content of the description should not be construed as a limitation on the present disclosure.

Example Clauses

Clause 1. A method for performing network configuration on apparatus, comprising: connecting, by an apparatus, to a network configuration hotspot provided by a router; sending first apparatus information of the apparatus to a server through the network configuration hotspot; receiving a hotspot switching command sent by the server according to the first apparatus information, wherein the hotspot switching command includes hotspot information of an online hotspot; and connecting to the online hotspot based on the hotspot switching command when a designated network configuration condition is met.

Clause 2. The method according to clause 1, wherein connecting, by the apparatus, to the network configuration hotspot provided by the router comprises: obtaining a network configuration hotspot list, wherein the network configuration hotspot list includes at least one network configuration hotspot and/or signal strength of the network configuration hotspot; connecting to the network configuration hotspot with the strongest signal strength; and when the connecting fails, connecting to the network configuration hotspot with a second strongest signal strength until the connecting to the network configuration hotspot succeeds.

Clause 3. The method according to clause 2, wherein sending first apparatus information of the apparatus to the server through the network configuration hotspot comprises: sending a connection request to the server through the network configuration hotspot to establish a secure connection between the apparatus and the server; obtaining the first apparatus information of the apparatus; and sending the first apparatus information and the network configuration hotspot list to the server.

Clause 4. The method according to clause 1 or 2 or 3, wherein before receiving the hotspot switching command sent by the server, the method further comprises: when a touch operation of a user is detected, entering a network configuration mode.

Clause 5. The method according to clause 4, wherein the designated network configuration condition at least includes the following condition: the apparatus entering the network configuration mode, and duration of entering the network configuration mode does not exceed a preset duration.

Clause 6. The method according to clause 1, further comprising: generating network configuration error information when the designated network configuration condition is not met; and sending the network configuration error information to the server.

Clause 7. The method according to clause 1, wherein after connecting to the online hotspot based on the hotspot switching command when the designated network configuration condition is met, the method further comprises: obtaining second apparatus information of the apparatus; and announcing the second apparatus information to the outside locally, and/or establishing a secure connection with the server based on the online hotspot, and sending the second apparatus information to the server.

Clause 8. A method for performing network configuration on apparatus, comprising: determining, by a network configuration application, a target network configuration apparatus, wherein the target network configuration apparatus connects to a network configuration hotspot provided by a router in advance and sends first apparatus information of the target network configuration apparatus to a server; generating a network configuration request based on the first apparatus information and hotspot information of a currently connected online hotspot; and sending the network configuration request to the server to request the server to perform network configuration on the apparatus according to the hotspot information of the online hotspot.

Clause 9. The method according to clause 8, wherein after sending the network configuration request to the server to request the server to perform the network configuration on the apparatus according to the hotspot information of the online hotspot, the method further comprises: receiving network configuration response information returned by the server based on the network configuration request, wherein the network configuration response information includes network configuration approval information, and the network configuration approval information includes instruction information of user touch operation; displaying the network configuration approval information; upon determining that a user performs a touch operation based on the network configuration approval information, generating network configuration preparation information; and sending the network configuration preparation information to the server to notify the server to perform the network configuration on the apparatus.

Clause 10. The method according to clause 9, wherein the network configuration response information further includes network configuration rejection information, and the method further comprises: displaying the network configuration rejection information to prompt the user to prohibit operating the apparatus.

Clause 11. The method according to any one of clauses 8 to 10, wherein before determining by the network configuration application the target network configuration apparatus, the method further comprises: connecting, by the network configuration application, to the online hotspot of the router and establishing a secure connection with the server.

Clause 12. The method according to clause 11, wherein determining, by the network configuration application, the target network configuration apparatus comprises: determining the hotspot information of the online hotspot; obtaining a to-be-network-configured apparatus list from the server side based on the hotspot information, the to-be-network-configured apparatus list including one or more apparatus to be network-configured, and first apparatus information of the apparatus; displaying the to-be-network-configured apparatus list; and setting the apparatus selected by a user in the to-be-network-configured apparatus list as the target network configuration apparatus.

Clause 13. The method according to clause 8, further comprising: obtaining second apparatus information of the apparatus, wherein the second apparatus information is apparatus information after the network configuration of the apparatus succeeds; determining that the network configuration of the apparatus succeeds based on the second apparatus information; and generating network configuration success information, and displaying the network configuration success information.

Clause 14. The method according to clause 13, wherein obtaining the second apparatus information of the apparatus comprises: receiving the second apparatus information broadcast by the apparatus; or broadcasting a query request in local, and receiving the second apparatus information returned by the apparatus based on the query request.

Clause 15. The method according to clause 13, further comprising: generating a binding request based on the second apparatus information; sending the binding request to the server to request the server to bind the second apparatus information and a corresponding apparatus; and receiving a binding result returned by the server based on the binding request.

Clause 16. A method for performing network configuration on apparatus, comprising: receiving a network configuration request sent by a network configuration application, wherein the network configuration request includes hotspot information of an online hotspot; generating a hotspot switching command based on the network configuration request; and sending the hotspot switching command to an apparatus needing network configuration through a network configuration hotspot, to make the apparatus switch a hotspot that the apparatus currently connects to from the network configuration hotspot to the online hotspot.

Clause 17. The method according to clause 16, wherein before sending the hotspot switching command to the apparatus needing network configuration through the network configuration hotspot, the method further comprises: establishing, by a server, a secure connection with the apparatus needing network configuration through the network configuration hotspot of a router; receiving first apparatus information sent by the apparatus and a network configuration hotspot list obtained by the apparatus; generating an association relationship between the first apparatus information and the network configuration hotspot list; and saving the first apparatus information, the network configuration hotspot list, and the association relationship.

Clause 18. The method according to clause 16 or 17, wherein each network configuration hotspot in the network configuration hotspot list includes a basic service set identifier BSSID; before receiving the network configuration request sent by the network configuration application, the method further comprises: establishing a secure connection with the network configuration application through the online hotspot of a router; receiving the hotspot information of the online hotspot sent by the network configuration application, wherein the hotspot information of the online hotspot includes the BSSID of the online hotspot; matching the BSSID of the online hotspot with BSSIDs in the network configuration hotspot list corresponding to all apparatuses stored in the server to obtain a to-be-network-configured apparatus list; and sending the to-be-network-configured apparatus list to be configured to the network configuration application.

Clause 19. The method according to clause 16, wherein after receiving the network configuration request sent by the network configuration application, the method further comprises: serializing all network configuration requests received for the same apparatus; processing the network configuration requests for the same apparatus one by one according to a preset processing sequence; during the processing, when a certain network configuration request is approved, temporarily storing or rejecting other network configuration requests for the same apparatus within a preset duration for processing the network configuration request until the approved network configuration request is processed or timed out.

Clause 20. The method according to clause 19, wherein generating the hotspot switching command based on the network configuration request comprises: generating network configuration approval information when the network configuration request is approved, wherein the network configuration approval information includes instruction information of user touch operation, and the network configuration approval information is configured to prompt the user to perform a touch operation on the apparatus; generating a network configuration rejection information when the network configuration request is rejected, wherein the network configuration rejection information is configured to prompt the user to prohibit operating the apparatus; generating network configuration response information based on the network configuration approval information or the network configuration rejection information, and sending the network configuration response information to the network configuration application; receiving network configuration preparation information sent by the network configuration application based on the network configuration approval information, wherein the network configuration preparation information is information generated after the network configuration application determining that the user performs the touch operation based on the network configuration approval information; and generating the hotspot switching command according to the network configuration preparation information.

Clause 21. The method according to clause 16, wherein after sending the hotspot switching command to the apparatus, the method further comprises: receiving network configuration error information sent by the apparatus, wherein the network configuration error information is information generated when the apparatus determines that a designated network configuration condition is not met after receiving the hotspot switching command.

Clause 22. The method according to clause 16, wherein after sending the hotspot switching command to the apparatus, the method further comprises: determining that the network configuration of apparatus succeeds when second apparatus information sent by the apparatus is received; receiving a binding request sent by the network configuration application, wherein the binding request includes second apparatus information of the apparatus; and upon determining that the second apparatus information sent by the apparatus is consistent with the second apparatus information sent by the network configuration application, generating a binding relationship between the second apparatus information and the apparatus, and returning a binding result to the network configuration application.

Clause 23. A method for performing network configuration on apparatus, comprising: intercepting a connection request sent by an apparatus to a corresponding server when a router detects that the apparatus is connected to a network configuration hotspot of the router; determining whether a server corresponding to the connection request meets a preset condition; and when the server meets the preset condition, sending the connection request to the server to make the server establish a secure connection with the apparatus and perform network configuration on the apparatus.

Clause 24. The method according to clause 23, further comprising: discarding the connection request when the server does not meet the preset condition.

Clause 25. The method according to clause 23 or 24, wherein determining whether the server corresponding to the connection request meets the preset condition comprises: determining vendor information of the server corresponding to the connection request; determining whether a vendor corresponding to the vendor information pays for a current network configuration service; if yes, determining that the server corresponding to the connection request meets the preset condition; and if not, determining that the server corresponding to the connection request does not meet the preset condition.

Clause 26. The method according to clause 23, wherein before intercepting the connection request sent by the apparatus to the corresponding server when the router detects that the apparatus is connected to the network configuration hotspot of the router, the method further comprises: after the router is powered on, turning on the network configuration hotspot, and setting the network configuration hotspot as a hidden hotspot.

Clause 27. An apparatus for network configuration, comprising: a network configuration hotspot connection module, configured to connect to a network configuration hotspot provided by a router; a first apparatus information sending module, configured to send a first apparatus information of the apparatus to a server through the network configuration hotspot; a hotspot switching command receiving module, configured to receive a hotspot switching command sent by the server according to the first apparatus information, the hotspot switching command including hotspot information of an online hotspot; and a hotspot switching module, configured to connect to the online hotspot based on the hotspot switching command when a designated network configuration condition is met.

Clause 28. A terminal for performing network configuration on apparatus, comprising: a target network configuration apparatus determining module, configured to determine a target network configuration apparatus by using a network configuration application, wherein the target network configuration apparatus connects to a network configuration hotspot provided by a router in advance and sends first apparatus information of the target network configuration apparatus to a server; a network configuration request generating module, configured to generate a network configuration request based on the first apparatus information and hotspot information of a currently connected online hotspot; and a network configuration request sending module, configured to send a network configuration request to the server to request the server to perform network configuration on the apparatus according to the hotspot information of the online hotspot.

Clause 29. A server for performing network configuration on apparatus, comprising: a network configuration request receiving module, configured to receive a network configuration request sent by a network configuration application, wherein the network configuration request includes hotspot information of an online hotspot; a hotspot switching command generating module, configured to generate a hotspot switching command based on the network configuration request; and a hotspot switching command sending module, configured to send the hotspot switching command to an apparatus needing network configuration through a network configuration hotspot to make the apparatus switch a hotspot that the apparatus connects to from the network configuration hotspot to the online hotspot.

Clause 30. A router that performs network configuration on apparatus, comprising: a connection request interception module, configured to intercept a connection request sent by an apparatus to a corresponding server when a router detects that the apparatus connects to a network configuration hotspot of the router; a determining module, configured to determine whether a server corresponding to the connection request meets a preset condition; and a connection request sending module, configured to send the connection request to the server when the server meets the preset condition to make the server establish a secure connection with the apparatus, and perform network configuration on the apparatus.

Clause 31. A network configuration system, comprising: the apparatus according to clause 27; the terminal according to clause 28; the server according to clause 29; and the router according to clause 30.

Clause 32. A system, comprising: one or more processors; and one or more machine-readable media with instructions stored thereon, when executed by the one or more processors, causing the system to execute the method for performing network configuration on apparatus according to one or more of clauses 1-7 and/or clauses 8-15 and/or clauses 16-22 and/or clauses 23-26.

Clause 33. One or more machine-readable media having instructions stored thereon, when executed by one or more processors, causing the one or more processors to execute the method for performing network configuration on apparatus according to one or more of clauses 1-7 and/or clauses 8-15 and/or clauses 16-22 and/or clauses 23-26.

What is claimed is:

1. A method implemented by a server comprising one or more processors and memory, the method comprising:
   receiving a network configuration request sent by a network configuration application, wherein the network configuration request includes hotspot information of an online hotspot;
   generating a hotspot switching command based on the network configuration request; and
   sending the hotspot switching command to an apparatus needing network configuration through a network configuration hotspot, to make the apparatus switch a hotspot that the apparatus currently connects to from the network configuration hotspot to the online hotspot.

2. The method according to claim 1, wherein before sending the hotspot switching command to the apparatus needing network configuration through the network configuration hotspot, the method further comprises:
   establishing a secure connection with the apparatus needing network configuration through the network configuration hotspot of a router;
   receiving first apparatus information sent by the apparatus and a network configuration hotspot list obtained by the apparatus;
   generating an association relationship between the first apparatus information and the network configuration hotspot list; and
   saving the first apparatus information, the network configuration hotspot list, and the association relationship.

3. The method according to claim 2, wherein each network configuration hotspot in the network configuration hotspot list includes a respective basic service set identifier (BSSID), and before receiving the network configuration request sent by the network configuration application, the method further comprises:
   establishing a secure connection with the network configuration application through the online hotspot;
   receiving the hotspot information of the online hotspot sent by the network configuration application, wherein the hotspot information of the online hotspot includes a BSSID of the online hotspot;
   matching the BSSID of the online hotspot with BSSIDs in the network configuration hotspot list corresponding to all apparatuses stored in the server to obtain a to-be-network-configured apparatus list; and
   sending the to-be-network-configured apparatus list to the network configuration application.

4. The method according to claim 1, wherein after receiving the network configuration request sent by the network configuration application, the method further comprises:
   serializing all network configuration requests received for a same apparatus;
   processing the network configuration requests for the same apparatus one by one according to a preset processing sequence; and
   during the processing, when a certain network configuration request is approved, temporarily storing or rejecting other network configuration requests for the same apparatus within a preset duration for processing the network configuration request until the approved network configuration request is processed or timed out.

5. The method according to claim 4, wherein generating the hotspot switching command based on the network configuration request comprises:
   generating network configuration approval information when the network configuration request is approved, wherein the network configuration approval information is configured to prompt a user to perform a touch operation on the apparatus;
   generating network configuration rejection information when the network configuration request is rejected, wherein the network configuration rejection information is configured to prompt the user to prohibit operating the apparatus;
   generating network configuration response information based on the network configuration approval information or the network configuration rejection information, and sending the network configuration response information to the network configuration application;

receiving network configuration preparation information sent by the network configuration application based on the network configuration approval information, wherein the network configuration preparation information includes information generated after the network configuration application determining that the user performs the touch operation based on the network configuration approval information; and generating the hotspot switching command according to the network configuration preparation information.

6. The method according to claim 1, wherein after sending the hotspot switching command to the apparatus, the method further comprises:

receiving network configuration error information sent by the apparatus, wherein the network configuration error information includes information generated when the apparatus determines that a designated network configuration condition is not met after receiving the hotspot switching command.

7. The method according to claim 1, wherein after sending the hotspot switching command to the apparatus, the method further comprises:

determining that the network configuration of the apparatus succeeds when second apparatus information sent by the apparatus is received;

receiving a binding request sent by the network configuration application, wherein the binding request includes third apparatus information of the apparatus; and upon determining that the second apparatus information sent by the apparatus is consistent with the third apparatus information sent by the network configuration application, generating a binding relationship between the second apparatus information and the apparatus, and returning a binding result to the network configuration application.

8. One or more computer readable media storing executable instructions that, when executed by one or more processors, cause the one or more processors to perform acts comprising:

intercepting a connection request sent by an apparatus to a corresponding server when a router detects that the apparatus is connected to a network configuration hotspot of the router;

determining whether the server corresponding to the connection request meets a preset condition; and when the server meets the preset condition, sending the connection request to the server to make the server establish a secure connection with the apparatus and perform network configuration on the apparatus.

9. The one or more computer readable media according to claim 8, the acts further comprising: discarding the connection request when the server does not meet the preset condition.

10. The one or more computer readable media according to claim 8, wherein determining whether the server corresponding to the connection request meets the preset condition comprises:

determining vendor information of the server corresponding to the connection request; and determining whether a vendor corresponding to the vendor information pays for a current network configuration service.

11. The one or more computer readable media according to claim 10, wherein determining whether the server corresponding to the connection request meets the preset condition further comprises:

in response to determining that the vendor corresponding to the vendor information pays for the current network configuration service, determining that the server corresponding to the connection request meets the preset condition.

12. The one or more computer readable media according to claim 10, wherein determining whether the server corresponding to the connection request meets the preset condition further comprises:

in response to determining that the vendor corresponding to the vendor information does not pay for the current network configuration service, determining that the server corresponding to the connection request does not meet the preset condition.

13. The one or more computer readable media according to claim 8, wherein before intercepting the connection request sent by the apparatus to the corresponding server when the router detects that the apparatus is connected to the network configuration hotspot of the router, the acts further comprise:

after the router is powered on, turning on the network configuration hotspot, and setting the network configuration hotspot as a hidden hotspot.

14. A server comprising:

one or more processors; and memory storing executable instructions that, when executed by the one or more processors, cause the one or more processors to perform acts comprising:

receiving a network configuration request sent by a network configuration application, wherein the network configuration request includes hotspot information of an online hotspot;

generating a hotspot switching command based on the network configuration request; and sending the hotspot switching command to an apparatus needing network configuration through a network configuration hotspot, to make the apparatus switch a hotspot that the apparatus currently connects to from the network configuration hotspot to the online hotspot.

15. The server according to claim 14, wherein before sending the hotspot switching command to the apparatus needing network configuration through the network configuration hotspot, the acts further comprise:

establishing a secure connection with the apparatus needing network configuration through the network configuration hotspot;

receiving first apparatus information sent by the apparatus and a network configuration hotspot list obtained by the apparatus;

generating an association relationship between the first apparatus information and the network configuration hotspot list; and saving the first apparatus information, the network configuration hotspot list, and the association relationship.

16. The server according to claim 15, wherein each network configuration hotspot in the network configuration hotspot list includes a respective basic service set identifier (BSSID), and before receiving the network configuration request sent by the network configuration application, the acts further comprise:

establishing a secure connection with the network configuration application through the online hotspot of a router;

receiving the hotspot information of the online hotspot sent by the network configuration application, wherein the hotspot information of the online hotspot includes a BSSID of the online hotspot;

matching the BSSID of the online hotspot with BSSIDs in the network configuration hotspot list corresponding to all apparatuses stored in the server to obtain a to-be-network-configured apparatus list; and sending the to-be-network-configured apparatus list to the network configuration application.

17. The server according to claim 14, wherein after receiving the network configuration request sent by the network configuration application, the acts further comprise:

serializing all network configuration requests received for a same apparatus;

processing the network configuration requests for the same apparatus one by one according to a preset processing sequence; and during the processing, when a certain network configuration request is approved, temporarily storing or rejecting other network configuration requests for the same apparatus within a preset duration for processing the network configuration request until the approved network configuration request is processed or timed out.

18. The server according to claim 17, wherein generating the hotspot switching command based on the network configuration request comprises:

generating network configuration approval information when the network configuration request is approved, wherein the network configuration approval information is configured to prompt the user to perform a touch operation on the apparatus;

generating a network configuration rejection information when the network configuration request is rejected, wherein the network configuration rejection information is configured to prompt the user to prohibit operating the apparatus;

generating network configuration response information based on the network configuration approval information or the network configuration rejection information, and sending the network configuration response information to the network configuration application;

receiving network configuration preparation information sent by the network configuration application based on the network configuration approval information, wherein the network configuration preparation information includes information generated after the network configuration application determining that the user performs the touch operation based on the network configuration approval information; and generating the hotspot switching command according to the network configuration preparation information.

19. The server according to claim 14, wherein after sending the hotspot switching command to the apparatus, the acts further comprise:

receiving network configuration error information sent by the apparatus, wherein the network configuration error information includes information generated when the apparatus determines that a designated network configuration condition is not met after receiving the hotspot switching command.

20. The server according to claim 14, wherein after sending the hotspot switching command to the apparatus, the acts further comprise:

determining that the network configuration of the apparatus succeeds when second apparatus information sent by the apparatus is received;

receiving a binding request sent by the network configuration application, wherein the binding request includes third apparatus information of the apparatus; and upon determining that the second apparatus information sent by the apparatus is consistent with the third apparatus information sent by the network configuration application, generating a binding relationship between the second apparatus information and the apparatus, and returning a binding result to the network configuration application.

\* \* \* \* \*